United States Patent
Kanekiyo et al.

(10) Patent No.: US 7,297,213 B2
(45) Date of Patent: *Nov. 20, 2007

(54) PERMANENT MAGNET INCLUDING MULTIPLE FERROMAGNETIC PHASES AND METHOD FOR PRODUCING THE MAGNET

(75) Inventors: Hirokazu Kanekiyo, Kyoto (JP); Toshio Miyoshi, Ibaraki (JP); Satoshi Hirosawa, Otsu (JP); Yasutaka Shigemoto, Ibaraki (JP); Yusuke Shioya, Ibaraki (JP)

(73) Assignee: Neomax Co., Ltd., Osaka (JP)

( * ) Notice: Subject to any disclaimer, the term of this patent is extended or adjusted under 35 U.S.C. 154(b) by 388 days.

This patent is subject to a terminal disclaimer.

(21) Appl. No.: 10/745,834

(22) Filed: Dec. 24, 2003

(65) Prior Publication Data

US 2004/0134567 A1    Jul. 15, 2004

Related U.S. Application Data

(62) Division of application No. 09/863,902, filed on May 24, 2001, now Pat. No. 6,706,124.

(30) Foreign Application Priority Data

| May 24, 2000 | (JP) | 2000-152234 |
| Jul. 4, 2000 | (JP) | 2000-201999 |
| Jul. 25, 2000 | (JP) | 2000-224519 |
| Sep. 26, 2000 | (JP) | 2000-291485 |

(51) Int. Cl.
H01F 1/057 (2006.01)
H01F 1/058 (2006.01)

(52) U.S. Cl. .................. 148/302; 148/301; 148/101

(58) Field of Classification Search ............ None
See application file for complete search history.

(56) References Cited

U.S. PATENT DOCUMENTS 4,585,473 A    4/1986 Narasimhan et al.

(Continued)

FOREIGN PATENT DOCUMENTS

DE    197 39 959 A1    3/1998

(Continued)

OTHER PUBLICATIONS

Merkulova et al., "The Temperature Dependence of Coercivity in Nancrystallyne Nd-Fe-B-(TiC) Magnets", Journal of Applied Physics, vol. 87, No. 9, (2000), pp. 4738-4740.

(Continued)

Primary Examiner—John P. Sheehan
(74) Attorney, Agent, or Firm—Keating & Bennett, LLP

(57) ABSTRACT

An iron-based rare earth alloy magnet has a composition represented by the general formula: $(Fe_{1-m}T_m)_{100-x-y-z}Q_xR_yM_z$, where T is at least one element selected from the group consisting of Co and Ni; Q is at least one element selected from the group consisting of B and C; R is at least one rare earth element substantially excluding La and Ce; and M is at least one metal element selected from the group consisting of Ti, Zr and Hf and always includes Ti. In this formula, the mole fractions x, y, z and m meet the inequalities of: 10 at $\% < x \leq 20$ at %; 6 at $\% \leq y < 10$ at %; 0.1 at $\% \leq z \leq 12$ at %; and $0 \leq m \leq 0.5$, respectively.

8 Claims, 12 Drawing Sheets

U.S. PATENT DOCUMENTS

| | | | |
|---|---|---|---|
| 4,597,938 A | 7/1986 | Matsuura et al. |
| 4,664,724 A | 5/1987 | Mizoguchi et al. |
| 4,770,723 A | 9/1988 | Sagawa et al. |
| 4,836,868 A | 6/1989 | Yajima et al. |
| 4,845,837 A | 7/1989 | Lloyd |
| 4,851,058 A | 7/1989 | Croat |
| 4,935,074 A | 6/1990 | De Mooij et al. |
| 4,994,109 A | 2/1991 | Willman et al. |
| 5,022,939 A | 6/1991 | Yajima et al. |
| 5,049,203 A | 9/1991 | Mukai et al. |
| 5,049,208 A | 9/1991 | Yajima et al. |
| 5,190,684 A | 3/1993 | Yamashita et al. |
| 5,209,789 A | 5/1993 | Yoneyama et al. |
| 5,225,004 A | 7/1993 | O'Handley et al. |
| 5,230,749 A | 7/1993 | Fujimura et al. |
| 5,240,513 A | 8/1993 | McCallum et al. |
| 5,595,608 A | 1/1997 | Takebuchi et al. |
| 5,597,425 A | 1/1997 | Akioka et al. |
| 5,665,177 A | 9/1997 | Fukuno et al. |
| 5,666,635 A | 9/1997 | Kaneko et al. |
| 5,725,792 A | 3/1998 | Panchanathan |
| 5,834,663 A | 11/1998 | Fukuno et al. |
| 5,872,501 A | 2/1999 | Hamano et al. |
| 5,905,424 A | 5/1999 | Panchanathan |
| 6,022,424 A | 2/2000 | Sellers et al. |
| 6,172,589 B1 | 1/2001 | Fujita et al. |
| 6,183,571 B1 | 2/2001 | Inoue et al. |
| 6,183,572 B1 | 2/2001 | Panchanathan et al. |
| 6,280,536 B1 | 8/2001 | Inoue et al. |
| 6,302,972 B1 | 10/2001 | Hirosawa et al. |
| 6,332,933 B1 | 12/2001 | Ma et al. |
| 6,352,599 B1 | 3/2002 | Chang et al. |
| 6,386,269 B1 | 5/2002 | Kanekiyo et al. |
| 6,471,786 B1 | 10/2002 | Shigemoto et al. |
| 6,478,889 B2 | 11/2002 | Kanekiyo |
| 6,648,984 B2 | 11/2003 | Takaki et al. |
| 6,706,124 B2 | 3/2004 | Kanekiyo et al. |
| 6,790,296 B2 | 9/2004 | Kanekiyo et al. |
| 6,796,363 B2 | 9/2004 | Arai et al. |
| 6,814,776 B2 | 11/2004 | Kanekiyo et al. |
| 6,890,392 B2 | 5/2005 | Kanekiyo et al. |
| 6,951,625 B2 * | 10/2005 | Arai et al. ............ 252/62.55 |
| 2001/0015239 A1 | 8/2001 | Kanekiyo |
| 2002/0017339 A1 | 2/2002 | Kanekiyo et al. |
| 2002/0117235 A1 | 8/2002 | Kanekiyo et al. |
| 2003/0136468 A1 | 7/2003 | Kanekiyo et al. |
| 2004/0051614 A1 | 3/2004 | Kanekiyo et al. |
| 2004/0099346 A1 | 5/2004 | Nishiuchi et al. |
| 2004/0134567 A1 | 7/2004 | Kanekiyo et al. |
| 2004/0194856 A1 | 10/2004 | Miyoshi et al. |
| 2005/0040923 A1 | 2/2005 | Miyoshi |

FOREIGN PATENT DOCUMENTS

| | | |
|---|---|---|
| EP | 0 197 712 | 10/1986 |
| EP | 0 302 395 | 2/1989 |
| EP | 0 529 148 | 3/1993 |
| EP | 0 632 471 | 1/1995 |
| EP | 0 874 375 | 10/1998 |
| EP | 0 959 478 | 11/1999 |
| EP | 1 018 751 | 7/2000 |
| EP | 1 061 532 A1 | 12/2000 |
| EP | 1 158 545 | 11/2001 |
| EP | 1 371 434 | 12/2003 |
| EP | 1 207 537 | 3/2004 |
| HU | 199904 B | 1/1989 |
| JP | 59-046008 A | 3/1984 |
| JP | 60-9852 A | 1/1985 |
| JP | 61-140350 | 6/1986 |
| JP | 62-062503 | 3/1987 |
| JP | 63-155601 | 6/1988 |
| JP | 63-190138 | 8/1988 |
| JP | 63-301505 | 12/1988 |
| JP | 64-000703 | 1/1989 |
| JP | 64-007501 | 1/1989 |
| JP | 64-081301 | 3/1989 |
| JP | 1-100242 | 4/1989 |
| JP | 01-162702 | 6/1989 |
| JP | 01-204401 | 8/1989 |
| JP | 02-247307 | 10/1990 |
| JP | 02-298003 | 12/1990 |
| JP | 03-260018 A | 11/1991 |
| JP | 03-261104 A | 11/1991 |
| JP | 03-264653 | 11/1991 |
| JP | 04-147604 | 5/1992 |
| JP | 05-269549 | 10/1993 |
| JP | 05-315174 | 11/1993 |
| JP | 06-140235 | 5/1994 |
| JP | 06-338407 | 12/1994 |
| JP | 06-32471 | 1/1995 |
| JP | 07-122412 | 5/1995 |
| JP | 07-226312 | 8/1995 |
| JP | 08-053710 | 2/1996 |
| JP | 08-124730 | 5/1996 |
| JP | 08-162312 | 6/1996 |
| JP | 8-167515 | 6/1996 |
| JP | 08-322175 | 12/1996 |
| JP | 09-155507 | 6/1997 |
| JP | 09-155513 | 6/1997 |
| JP | 10-53844 | 2/1998 |
| JP | 10-088294 A1 | 4/1998 |
| JP | 10-282790 | 10/1998 |
| JP | 11-8109 | 1/1999 |
| JP | 64-007502 | 1/1999 |
| JP | 11-071646 A | 3/1999 |
| JP | 11-101607 | 4/1999 |
| JP | 11-206075 | 7/1999 |
| JP | 11-323509 | 11/1999 |
| JP | 2000-079449 | 3/2000 |
| JP | 2000-079451 | 3/2000 |
| JP | 2000-234137 | 8/2000 |
| JP | 2000-235909 | 8/2000 |
| JP | 2000-348919 | 12/2000 |
| JP | 2001-244107 | 9/2001 |
| JP | 2002-64009 | 2/2002 |
| JP | 2002-80921 | 3/2002 |
| JP | 2002-175908 | 6/2002 |
| JP | 2002-212686 | 7/2002 |
| JP | 2002-239688 | 8/2002 |
| JP | 2002-302702 | 10/2002 |
| KR | 1998-16178 B1 | 5/1998 |
| RU | 2 136 069 | 9/1999 |
| WO | 99/21196 A1 | 4/1999 |
| WO | WO 00/03403 | 1/2000 |
| WO | WO 00/45397 | 8/2000 |
| WO | WO 00/52713 | 9/2000 |
| WO | WO 00/52715 | 9/2000 |
| WO | WO 01/68297 | 9/2001 |
| WO | WO 02/067275 | 8/2002 |
| WO | WO 02/093591 | 11/2002 |

OTHER PUBLICATIONS

Chang et al., "High Performance $\alpha$-Fe/$R_2Fe_{14}$B-Type Nanocomposites with Nominal Compositions of $(Nd,La)_{9.5}$ $Fe_{78}$ $xCo_xCr_2B_{10.5}$", Journal of Magnetism and Magnetic Materials, vol. 189, No. 1 (1998), pp. 55-61.

Coehoorn et al., "Novel Permanent Magnetic Materials Made by Rapid Quenching", pp. 669-670, Dec. 1988, Journal de Physique.

Chang et al., The Effects of Refractory Metals on the Magnetic Properties of a-Fe/R2Fe14B-Type Nanocomposites:, pp. 3265-3267, Sep. 1999, IEEE Transactions on Magnetics, vol. 35, No. 5.

Chang et al., "Magnetic and Microstructure Studies of Boron-Enriched . . . Melt-Spun Ribbons", pp. 3312-3314, Sep. 2000, IEEE Transactions on Magnetics, vol. 36, No. 5.

Chang et al., "High Performance . . . Nanocomposites", pp. 121-123, Jan. 1998, Applied Physics Letters, vol. 72, No. 1.

Chang et al., "The Effect of Boron and Rare Earth Contents on the Magnetic Properties of La and Cr Substitued . . . Nanocomposites", pp. 6271-6273, Jun. 1998, Journal of Applied Physics, vol. 83, No. 8.

Chiriac et al., "ND Fe Co HF B Strip Cast Alloy", pp. 5338-5340, May 2000, Journal of Applied Physics, vol. 87, No. 9.

Chang et al., "The Effect of La-Substitution on the Microstructure and Magnetic Properties of Nanocomposite NdFeB Melt Spun Ribbons", pp. 65-70, Mar. 1997, Journal of Magnetism and Magnetic Materials, vol. 167, Nos. 1-2.

Chen et al., A Study on the Phase Transformation and Exchange-Coupling of . . . Nanocomposites:, pp. 209-219, Symposium held Apr. 4-5, 1999, Advanced Hard and Soft Magnetic Materials, Materials Research Society, Symposium Proceedings vol. 577.

Specification and Drawings for U.S. Appl. No. 09/455,469, "Nanocomposite Magnet Material and Method for Producing Nanocomposite Magnet", filed Dec. 6, 1999, Inventors: Satoshi Hirosawa et al.

Bernardi et al., "Microstructural Analysis of Strip Cast Nd-Fe-B Alloys for High (BH) max Magnets", pp. 6396-6398, Jun. 1998, Journal of Applied Physics, vol. 83, No. 11.

L. Henderson Lewis et al., "Phase Composition and Magnetic Characteristics of Inert Gas-Atomized RE-Fe-B-Based Powders", IEEE Transactions on Magnetics, vol. 31, No. 6, Nov. 1995, pp. 3641-3643.

M.J. Kramer et al., "A Generalized Solidification Model and Microstructural Verification for the Nd-Fe-B-Ti-C System Processed by Rapid Solidification", J. Appl. Phys. 81(8), Apr. 1997, pp. 4459-4461.

Missell et al., "Rare-Earth Magnets and Their Applications," Proceedings of the 14th International Workshop, Sep. 1996, pp. 28-37, vol. 1, World Scientific, Singagpore, new Jersey, London, Hong Kong.

Yao, J.M. et al, "Coercivity of Ti-modified ($\alpha$-Fe)-$Nd_2Fe_{14}B$ Nanocrystalline Alloys", Journal of Applied Physics, Nov. 15, 1994, pp. 7071-7073, vol. 76, No. 10, American Institute of Physics, Woodbury, New York, USA.

Z.S. Wronski, "Microstructure and Magnetic Properties of Low-Neodymium Nd-Fe-B-Si Magnets Produced from HP Gas Atomized Powder", J. Appl. Phys. 69(8), Apr. 1991, pp. 5507-5509.

D.J. Branagan, et al., "A New Generation of Gas Atomized Powder with Improved Levels of Energy Product and Processability", IEEE Transacttions of Magnetics, vol. 32, No. 5, Sep. 1996, pp. 5097-5099.

Chang et al., "High Performance . . . Nanocomposites", pp. 121-123, Jan. 1998, Applied Physics Letters, vol. 72, No. 1.

Lewis L H et al, "Compositional Clustering in ND2FE14B Melt Spun Ribbons" Journal of Applied Physics, American Institue of Physics. New York, US, vol. 87, No. 9, May 1, 2000, pp. 4735-4737.

G. Ya. Merkulova, et al., "The temperature dependence of coercivity in nanocrystalline Nd-Fe-B-(TiC)magnets", Journal of Applied Physics, vo.87 No. 9, May 2000, pp. 4738-4740.

F. Yamahsita, "Applications of Rare-Earth Magnets to the Small Motor Industry," Proceedings of the 17th International Workshop, Aug. 18-22, 2002, Newark, DE, USA. pp. 100-111.

U.S. Appl. No. 10/432,862, filed May 28, 2003. "Nanocomposite magnet."

U.S. Appl. No. 10/484,072, filed Jan. 16, 2004. "Method for producing nanocomposite magnet using atomizing method."

U.S. Appl. No. 10/642,324, filed Aug. 18, 2003. "Compound for rare-earth bonded magnet and bonded magnet using the compound."

U.S. Appl. No. 09/863,902, filed May 24, 2001. "Permanent magnet including multiple ferromagnetic phases and method for producing the magnet." now U.S. Pat. 6,706,124.

U.S. Appl. No. 09/986,390, filed Nov. 8, 2001. "Nanocomposite magnet and method for producing same." now U.S. Pat. 6,790,296.

Office Action issued Jun. 17, 2005. U.S. Appl. No. 10/432,862. "Nanocomposite Magnet."

Office Action issued Mar. 28, 2005. U.S. Appl. No. 10/381,005. "Iron-based rare earth alloy nanocomposite magnet and method for producing the same."

U.S. Appl. No. 10/381,005, filed Mar. 20, 2003. "Iron-based rare earth alloy nanocomposite magnet and method for producing the same."

Hermann et al., Growth Kinetics in Undercooled Nd-Fe-B Alloys with Carbon and Ti or Mo Additions, pp. 82-86, Apr. 2000, Journal of Magnetism and Magnetic Materials, vol. 213, Nos. 1-2.

International Search Report for PCT/JP01/04244, mailed Sep. 12, 2001.

US 4,756,775, 07/1988, Croat (withdrawn)

* cited by examiner

PERMANENT MAGNET INCLUDING MULTIPLE FERROMAGNETIC PHASES AND METHOD FOR PRODUCING THE MAGNET

This application is a Divisional of U.S. patent application Ser. No. 09/863,902 filed May 24, 2001, now U.S. Pat. No. 6,706,124.

BACKGROUND OF THE INVENTION

1. Field of the Invention

The present invention generally relates to a method for producing a permanent magnet effectively applicable to motors and actuators of various types, and more particularly relates to a method for producing an iron-based rare earth alloy magnet including multiple ferromagnetic phases.

2. Description of the Related Art

Recently, it has become more and more necessary to further enhance the performance of, and further reduce the size and weight of, consumer electronic appliances, office automation appliances and various other types of electric equipment. For these purposes, a permanent magnet for use in each of these appliances is required to maximize its performance to weight ratio when operated as a magnetic circuit. For example, a permanent magnet with a remanence $B_r$ of 0.5 T or more is now in high demand. Hard ferrite magnets have been used widely because magnets of this type are relatively inexpensive. However, the hard ferrite magnets cannot show that high remanence $B_r$ of 0.5 T or more.

An Sm—Co magnet, produced by a powder metallurgical process, is currently known as a typical permanent magnet with that high remanence $B_r$ of 0.5 T or more. Examples of other high-remanence magnets include Nd—Fe—B type magnets produced by a powder metallurgical or melt quenching process. An Nd—Fe—B type magnet of the former type is disclosed in Japanese Laid-Open Publication No. 59-46008, for example, and an Nd—Fe—B type magnet of the latter type is disclosed in Japanese Laid-Open Publication No. 60-9852, for instance.

However, the Sm—Co magnet is expensive, because Sm and Co are both expensive materials.

As for the Nd—Fe—B type magnet on the other hand, the magnet is mainly composed of relatively inexpensive Fe (typically accounting for 60 wt % to 70 wt % of the total quantity), and is much less expensive than the Sm—Co magnet. Nevertheless, it is still expensive to produce the Nd—Fe—B type magnet. This is partly because huge equipment and a great number of process steps are needed to separate and purify, or to obtain by reduction reaction, Nd, which usually accounts for 10 at % to 15 at % of the total quantity. Also, a powder metallurgical process normally requires a relatively large number of process steps by its nature.

Compared to an Nd—Fe—B type sintered magnet formed by a powder metallurgical process, an Nd—Fe—B type rapidly solidified magnet can be produced at a lower process cost by a melt quenching process. However, to obtain a permanent magnet in bulk by a melt quenching process, a bonded magnet should be formed by compounding a magnet powder, made from a rapidly solidified alloy, with a resin binder. Accordingly, the magnet powder normally accounts for at most about 80 volume % of the molded bonded magnet. Also, a rapidly solidified alloy, formed by a melt quenching process, is magnetically isotropic.

For these reasons, an Nd—Fe—B type rapidly solidified magnet produced by a melt quenching process has a remanence $B_r$ lower than that of a magnetically anisotropic Nd—Fe—B type sintered magnet produced by a powder metallurgical process.

As disclosed in Japanese Laid-Open Publication No. 1-7502, a technique of adding at least one element selected from the group consisting of Zr, Nb, Mo, Hf, Ta and W and at least one more element selected from the group consisting of Ti, V and Cr in combination effectively improves the magnetic properties of an Nd—Fe—B type rapidly solidified magnet. When these elements are added, the magnet can have its coercivity $H_{cJ}$ and anticorrosiveness increased. However, the only known effective technique of improving the remanence $B_r$ is increasing the density of a bonded magnet.

As for an Nd—Fe—B type magnet, an alternative magnet material was proposed by R. Coehoorn et al., in J. de Phys, C8, 1998, pp. 669-670. The Coehoorn material has a composition including a rare earth element at a relatively low mole fraction (i.e., around $Nd_{3.8}Fe_{77.2}B_{19}$, where the subscripts are indicated in atomic percentages) and an $Fe_3B$ primary phase. This permanent magnet material is obtained by heating and crystallizing an amorphous alloy that has been prepared by a melt quenching process. Also, the crystallized material has a metastable structure in which soft magnetic $Fe_3B$ and hard magnetic $Nd_2Fe_{14}B$ phases coexist and in which crystal grains of very small sizes (i.e., on the order of several nanometers) are dispersed finely and uniformly as a composite of these two crystalline phases. For that reason, a magnet made from such a material is called a "nanocomposite magnet". It was reported that a nanocomposite magnet like this has a remanence $B_r$ of as high as 1 T or more. But the coercivity HE thereof is relatively low, i.e., in the range from 160 kA/m to 240 kA/m. Accordingly, this permanent magnet is applicable only when the operating point of the magnet is 1 or more.

It has been proposed that various metal elements be added to the material alloy of a nanocomposite magnet to improve the magnetic properties thereof. See, for example, Japanese Laid-Open Publication No. 3-261104, U.S. Pat. No. 4,836,868, Japanese Laid-Open Publication No. 7-122412, PCT International Publication No. WO 00/03403 and W. C. Chan et. al., "The Effects of Refractory Metals on the Magnetic Properties of α-Fe/$R_2Fe_{14}B$-type Nanocomposites", IEEE Trans. Magn. No.5, INTER-MAG. 99, Kyongiu, Korea, pp.3265-3267, 1999. However, none of these proposed techniques can always obtain a sufficient "characteristic value per cost".

SUMMARY OF THE INVENTION

An object of the present invention is to provide a method for producing an iron-based alloy permanent magnet, exhibiting excellent magnetic properties including a high coercivity $H_{cJ}$ of e.g., 480 kA/m or more and a high remanence $B_r$ of e.g., 0.85 T or more, at a low cost.

An iron-based rare earth alloy magnet according to the present invention has a composition represented by the general formula: $(Fe_{1-m}T_m)_{100-x-y-z}Q_xR_yM_z$, where T is at least one element selected from the group consisting of Co and Ni; Q is at least one element selected from the group consisting of B and C; R is at least one rare earth element substantially excluding La and Ce; and M is at least one metal element selected from the group consisting of Ti, Zr and Hf and always includes Ti. In this formula, the mole fractions x, y, z and m meet the inequalities of: 10 at %<x≦20 at %; 6 at %≦y<10 at %; 0.1 at %≦z≦12 at %; and 0≦m≦0.5, respectively. The magnet has two or more ferromagnetic crystalline phases including hard and soft magnetic phases. An average grain size of the hard magnetic phase is equal to or greater than 10 nm and equal to or less than 200 nm, while that of the soft magnetic phase is equal to or greater than 1 nm and equal to or less than 100 nm.

In one embodiment of the present invention, the mole fractions x, y and z preferably meet the inequalities of: 10 at %<x<17 at %; 8 at %≦y≦9.3 at %; and 0.5 at %≦z≦6 at %, respectively.

In another embodiment of the present invention, $R_2Fe_{14}B$ phase, boride phase and α-Fe phase may coexist in the same metal structure.

Specifically, an average crystal grain size of the α-Fe and boride phases is preferably from 1 nm to 50 nm.

More specifically, the boride phase preferably includes an iron-based boride with ferromagnetic properties.

In this particular embodiment, the iron-based boride preferably includes $Fe_3B$ and/or $Fe_{23}B_6$.

In still another embodiment, the mole fractions x and z preferably meet the condition z/x≧0.1.

In yet another embodiment, the mole fraction y of the rare earth element(s) R may be 9.5 at % or less.

Alternatively, the mole fraction y of the rare earth element(s) R may also be 9.0 at % or less.

In yet another embodiment, the magnet may have been shaped in a thin strip with a thickness of 10 μm to 300 μm.

In yet another embodiment, the magnet may have been pulverized into powder particles.

Then, a mean particle size of the powder particles is preferably from 30 μm to 250 μm.

In yet another embodiment, the magnet may exhibit hard magnetic properties as represented by a coercivity $H_{cJ}$ of 480 kA/m or more and a remanence $B_r$ of 0.7 T or more.

In yet another embodiment, the magnet may also exhibit hard magnetic properties as represented by a remanence $B_r$ of 0.85 T or more, a maximum energy product $(BH)_{max}$ of 120 kJ/m³ or more and an intrinsic coercivity $H_{cJ}$ of 480 kA/m or more.

A bonded magnet according to the present invention is formed by molding a magnet powder, including the powder particles of the inventive iron-based rare earth alloy magnet, with a resin binder.

A rapidly solidified alloy according to the present invention is a material for an iron-based rare earth alloy magnet. The alloy has a composition represented by the general formula: $(Fe_{1-m}T_m)_{100-x-y-z}Q_xR_yM_z$, where T is at least one element selected from the group consisting of Co and Ni; Q is at least one element selected from the group consisting of B and C; R is at least one rare earth element substantially excluding La and Ce; and M is at least one metal element selected from the group consisting of Ti, Zr and Hf and always includes Ti. In this formula, the mole fractions x, y, z and m meet the inequalities of: 10 at %<x≦20 at %; 6 at %≦y<10 at %; 0.1 at %≦z≦12 at %; and 0≦m≦0.5, respectively.

In one embodiment of the present invention, the rapidly solidified alloy preferably has a structure, in which substantially no α-Fe phase is included but $R_2Fe_{14}B$ compound and amorphous phases are included and in which the $R_2Fe_{14}B$ phase accounts for a 60 volume percent or more.

Specifically, the mole fractions x, y and z preferably meet the inequalities of: 10 at %<x<17 at %; 8 at %≦y≦9.3 at %; and 0.5 at %≦z≦6 at %, respectively. The $R_2Fe_{14}B$ phase, accounting for 60 volume percent or more of the alloy, preferably has an average grain size of 50 nm or less.

Another rapidly solidified alloy according to the present invention is also a material for an iron-based rare earth alloy magnet. The solidified alloy is prepared by rapidly cooling a melt of a material alloy comprising Fe, Q, R and Ti, where Q is at least one element selected from the group consisting of B and C; and R is a rare earth element. The solidified alloy has a structure in which an amorphous phase is included and in which heat treatment starts to grow a compound crystalline phase with an $R_2Fe_{14}B$ crystalline structure before starting to grow an α-Fe crystalline phase.

An inventive method for producing an iron-based rare earth alloy magnet includes the steps of: preparing a melt of a material alloy that includes Fe, Q, R and Ti, where Q is at least one element selected from the group consisting of B and C, and R is a rare earth element; cooling the melt to make a solidified alloy including an amorphous phase; and heating the solidified alloy to start growing a compound crystalline phase with an $R_2Fe_{14}B$ crystalline structure and then an α-Fe crystalline phase.

In one embodiment of the present invention, the melt is preferably cooled by a strip casting process.

Another inventive method for producing an iron-based rare earth alloy magnet includes the step of preparing a melt of a material alloy. The material alloy has a composition represented by the general formula: $(Fe_{1-m}T_m)_{100-x-y-z}Q_xR_yM_z$, where T is at least one element selected from the group consisting of Co and Ni; Q is at least one element selected from the group consisting of B and C; R is at least one rare earth element substantially excluding La and Ce; and M is at least one metal element selected from the group consisting of Ti, Zr and Hf and always includes Ti. The mole fractions x, y, z and m meet the inequalities of: 10 at %<x≦20 at %; 6 at %≦y<10 at %; 0.1 at %≦z≦12 at %; and 0≦m≦0.5, respectively. The method further includes the steps of: rapidly cooling the melt to make a rapidly solidified alloy in which an $R_2Fe_{14}B$ crystalline phase and an amorphous phase coexist; and crystallizing the rapidly solidified alloy to form a structure in which two or more ferromagnetic crystalline phases, including hard and soft magnetic phases, exist. An average grain size of the hard magnetic phase is equal to or greater than 10 nm and equal to or less than 200 nm, while that of the soft magnetic phase is equal to or greater than 1 nm and equal to or less than 100 nm.

In one embodiment of the present invention, the rapidly solidified alloy made in the cooling step preferably includes an $R_2Fe_{14}B$ phase at 60 volume percent or more.

In another embodiment of the present invention, the cooling step preferably includes rapidly cooling the melt within an ambient gas at a pressure of 30 kPa or more to make a rapidly solidified alloy including an $R_2Fe_{14}B$ phase with an average grain size of 50 nm or less.

In this particular embodiment, the cooling step may include: bringing the melt into contact with the surface of a rotating chill roller to obtain a supercooled liquid alloy; and dissipating heat from the supercooled alloy into the ambient gas to grow the $R_2Fe_{14}B$ phase after the supercooled alloy has left the chill roller.

In still another embodiment, the method may include the step of heating and crystallizing the rapidly solidified alloy to form a structure in which three or more crystalline phases, including at least $R_2Fe_{14}B$ compound, α-Fe and boride phases, are included. In this process step, an average crystal grain size of the $R_2Fe_{14}B$ phase is set equal to or greater than 20 ru and equal to or less than 150 nm, while that of the α-Fe and boride phases is set equal to or greater than 1 nm and equal to or less than 50 nm.

Specifically, the boride phase preferably includes an iron-based boride with ferromagnetic properties.

More particularly, the iron-based boride preferably includes $Fe_3B$ and/or $Fe_{23}B_6$.

In yet another embodiment, the melt may be cooled by a strip casting process.

An inventive method for producing a bonded magnet includes the steps of: preparing a powder of the iron-based rare earth alloy magnet by the second inventive method for producing the iron-based rare earth alloy magnet; and producing a bonded magnet using the powder of the iron-based rare earth alloy magnet.

DESCRIPTION OF THE PREFERRED EMBODIMENTS

Figure 1:
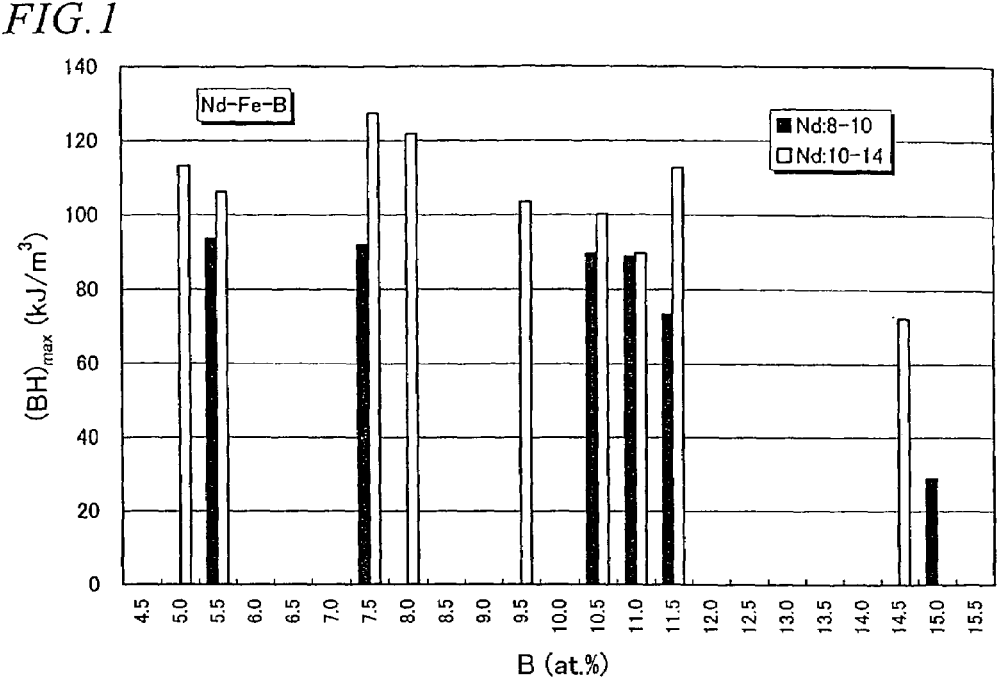
FIG. 1 is a graph illustrating a relationship between the maximum energy product $(BH)_{max}$ and the concentration of boron in an Nd—Fe—B type nanocomposite magnet to which no Ti is added.

The iron-based rare earth alloy magnet of the present invention is formed by rapidly cooling and solidifying a melt of a rare earth element-iron-boron type alloy containing Ti. The rapidly solidified alloy includes crystalline phases. However, if necessary, the alloy is heated and further crystallized.

The present inventors found that when Ti is added to an iron-based rare earth alloy with a composition defined by a particular combination of mole fraction ranges, the crystal growth of an α-Fe phase, often observed while the melt is cooled, is suppressible, and the crystal growth of an $R_2Fe_{14}B$ phase can proceed preferentially and uniformly. The basic idea of the present invention lies in this finding.

Unless Ti is added to the material alloy, the α-Fe phase easily nucleates and grows faster and earlier than the crystal growth an $Nd_2Fe_{14}B$ phase. Accordingly, when the rapidly solidified alloy has been thermally treated, the α-Fe phase with soft magnetic properties will have grown excessively.

In contrast, where Ti is added to the material alloy, the crystallization kinetics of the α-Fe phase would be slowed down, i.e., it Would take a longer time for the a Fe phase to nucleate and grow. Thus, the present inventors believe the $Nd_2Fe_{14}B$ phase would start to nucleate and grow before the α-Fe phase has grown coarsely. For that reason, where Ti is added, crystal grains in the $Nd_2Fe_{14}B$ phase can be grown sufficiently and dispersed uniformly before the α-Fe phase grows too much. Furthermore, the addition of Ti appears to enhance the crystallization of iron-based borides. Since Ti has a strong affinity to B, Ti stabilizes the iron-based borides by partitioning in the borides.

In the present invention, the additive Ti contributes to considerable reduction in grain size of the soft magnetic phases (e.g., iron-based boride and α-Fe phases), uniform dispersion of the $Nd_2Fe_{14}B$ phase and increase in volume fraction of the $Nd_2Fe_{14}B$ phase. As a result, the composite magnet can have its coercivity and remanence increased sufficiently and can have the loop squareness of its demagnetization curve improved.

Hereinafter, the iron-based rare earth alloy magnet of the present invention will be described in further detail.

The inventive iron-based rare earth alloy magnet is preferably represented by the general formula: $(Fe_{1-m}T_m)_{100-x-y-z}Q_xR_yM_z$ where T is at least one element selected from the group consisting of Co and Ni; Q is at least one element selected from the group consisting of B and C; R is at least one rare earth element substantially excluding La and Ce; and M is at least one metal element selected from the group consisting of Ti, Zr and Hf and always includes Ti.

The mole fractions x, y, z and m preferably meet the inequalities of: 10 at %<x≦20 at %; 6 at %≦y<10 at %; 0.1 at %≦z≦12 at %; and 0≦m≦0.5, respectively.

The iron-based rare earth alloy magnet of the present invention includes a rare earth element at as small a mole fraction as 10 at % or less. However, since Ti has been added to the material alloy thereof, the inventive magnet can attain the unexpected effects of keeping, or even increasing, the remanence $B_r$ and improving the loop squareness of the demagnetization curve thereof compared to an alloy not including Ti.

In the iron-based rare earth alloy magnet of the present invention, the soft magnetic phases have a very small grain size. Accordingly, the respective constituent phases are coupled together through exchange interactions. For that reason, even though soft magnetic phases, like iron-based boride and α-Fe phases, exist therein in addition to the hard magnetic $R_2Fe_{14}B$ phase, the alloy as a whole can show excellent squareness at the demagnetization curve thereof.

The inventive iron-based rare earth alloy magnet preferably includes iron-based boride and α-Fe phases with a saturation magnetization equal to, or even higher than, that of the $R_2Fe_{14}B$ phase. Examples of the iron-based borides include $Fe_3B$ (with a saturation magnetization of 1.5 T) and $Fe_{23}B_6$ (with a saturation magnetization of 1.6 T). In this case, the $R_2Fe_{14}B$ phase has a saturation magnetization of about 1.6 T and the α-Fe phase has a saturation magnetization of 2.1 T.

Normally, where the mole fraction x of B is greater than 10 at % and the mole fraction y of the rare earth element R is from 6 at % to 8 at %, $R_2Fe_{23}B_3$ is produced. However, even when a material alloy with such a composition is used, the addition of Ti can produce $R_2Fe_{14}B$, $Fe_{23}B_6$ and α-Fe, not $R_2Fe_{23}B_3$, in the present invention. These iron-based borides contribute to increasing the remanence.

As a result of experiments, the present inventors discovered that only when Ti was added, the remanence did not decrease but rather increased as opposed to any other metal element additive such as V, Cr, Mn, Nb or Mo. Also, when Ti was added, the loop squareness of the demagnetization curve was much better than that obtained by adding any of the elements cited above.

Furthermore, these effects attained by the additive Ti are particularly remarkable where the concentration of B is greater than 10 at %. Hereinafter, this point will be described with reference to FIGS. 1 and 2.

Figure 2:
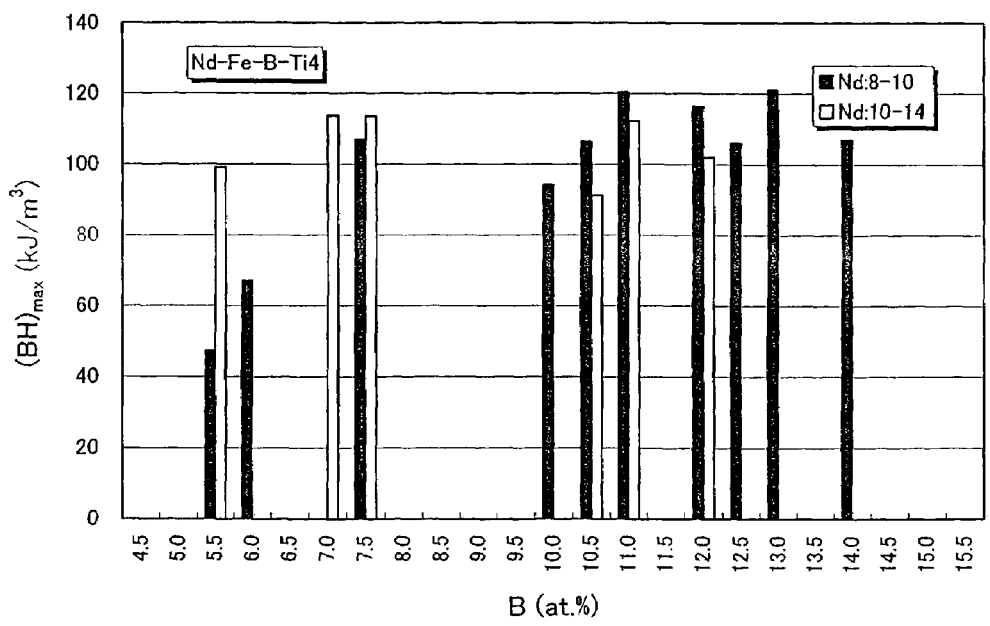
FIG. 2 is a graph illustrating a relationship between the maximum energy product $(BH)_{max}$ and the concentration of boron in an Nd—Fe—B type nanocomposite magnet to which Ti is added.

FIG. 1 is a graph illustrating a relationship between the maximum energy product $(BH)_{max}$ and the concentration of boron in an Nd—Fe—B type magnet to which no Ti is added. In FIG. 1, the white bars represent data about samples containing Nd at between 10 at % and 14 at %, while the black bars represent data about samples containing Nd at between 8 at % and 10 at %. On the other hand, FIG. 2 is a graph illustrating a relationship between the maximum energy product $(BH)_{max}$ and the concentration of boron in an Nd—Fe—B type magnet to which Ti is added. In FIG. 2, the white bars also represent data about samples containing Nd at between 10 at % and 14 at %, while the black bars also represent data about samples containing Nd at between 8 at % and 10 at %.

As can be seen from FIG. 1, once the concentration of boron exceeds 10 at %, the samples including no Ti have their maximum energy products $(BH)_{max}$ decreased no matter how much Nd is contained therein. Where the content of Nd is between 10 at % and 14 at %, this decrease is particularly noticeable. This tendency has been well known in the art and it has been widely believed that any permanent magnet, including an $Nd_2Fe_{14}B$ phase as its primary phase, should not contain more than 10 at % of boron. For instance, U.S. Pat. No. 4,836,868 discloses a working example in which the concentration of boron is set to from 5 at % to 9.5 at %. This patent teaches that the concentration of boron should preferably be equal to or greater than 4 at % and less than 12 at %, more preferably from 4 at % to 10 at %.

In contrast, as can be seen from FIG. 2, the samples including the additive Ti have their maximum energy products $(BH)_{max}$ increased in a certain range where the B concentration is greater than 10 at %. This increase is particularly remarkable where the Nd content is between 8 at % and 10 at %.

Thus, the present invention can reverse the conventional misbelief that a B concentration of greater than 10 at % degrades the magnetic properties and can attain the unexpected effects just by adding Ti to the material alloy.

Next, it will be described how to produce the iron-based rare earth alloy magnet of the present invention.

In the inventive process, a melt of the iron-based rare earth alloy with the above composition is rapidly cooled within an inert gas environment, thereby preparing a rapidly solidified alloy including an $R_2Fe_{14}B$ phase at 60 volume % or more. The average grain size of the $R_2Fe_{14}B$ phase in the quenched alloy is 50 nm or less, for example. If necessary, this quenched alloy may be heat-treated. Then, the amorphous phases remaining in the alloy can be crystallized.

In a preferred embodiment, the melt is rapidly cooled within an environment at a pressure of 30 kPa or more. Then, the melt is not just rapidly cooled through the contact with a chill roller but also further cooled due to secondary cooling effects caused by the ambient gas even after the solidified alloy left the roller.

By appropriately adjusting the circumference velocity of the chill roller, it is possible to transform the alloy into a supercooled liquid when the alloy leaves the chill roller. After leaving the chill roller, the alloy in the supercooled liquid state has its heat dissipated into the ambient gas so as to be crystallized.

Figure 3:
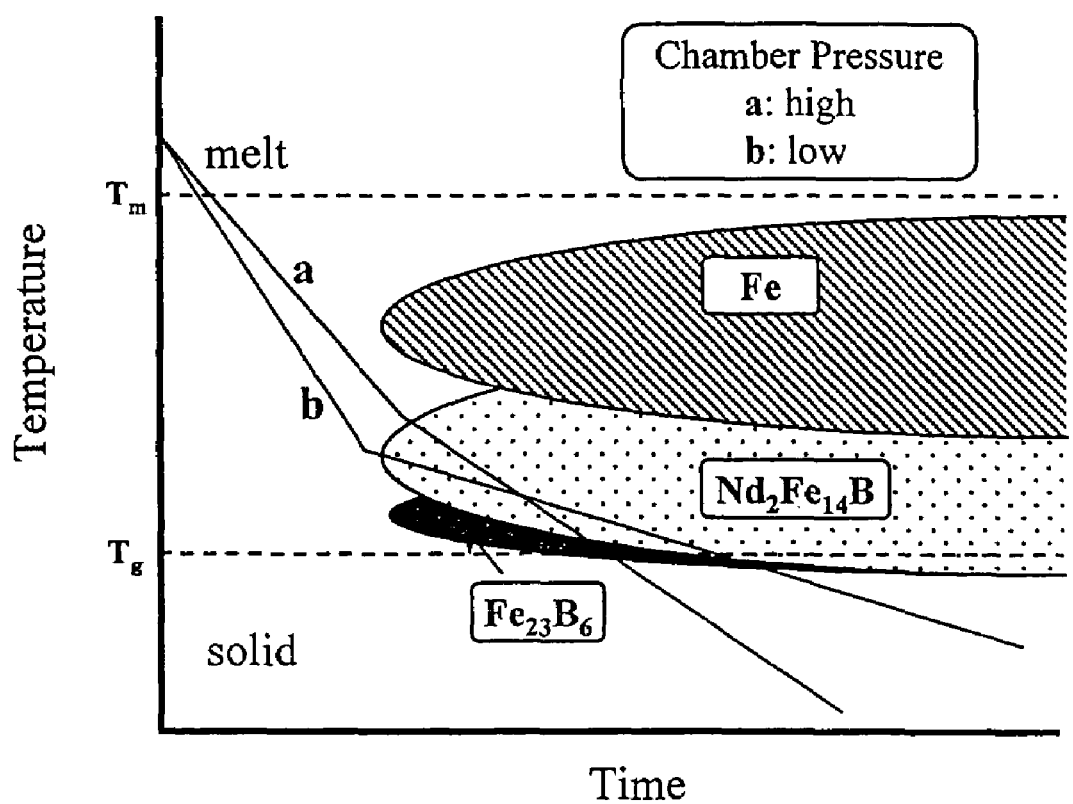
FIG. 3 is a graph schematically illustrating secondary cooling effects of an ambient gas by a relationship between the time passed since a cooling process was started and the temperature of an alloy.

Next, it will be described with reference to FIG. 3 how the ambient gas brings about the secondary cooling effects. FIG. 3 is a graph schematically illustrating a relationship between the time passed since the rapid cooling process was started and the temperature of the alloy. FIG. 3 illustrates two types of alloy cooling passages a and b associated with relatively high and relatively low ambient gas pressures of greater than 30 kPa and less than 30 kPa, respectively. The ranges in which α-Fe, $Nd_2Fe_{14}B$ and $Fe_{23}B_6$ phases crystallize are illustrated in FIG. 3 as well, where $T_m$ indicates the melting point of the alloy and $T_g$ indicates the glass transition point of the alloy.

As can be seen from FIG. 3, where the ambient gas has a relatively low pressure (corresponding to the passage b), the ambient gas would not bring about so great secondary cooling effects. Accordingly, in that case, the surface velocity of the chill roller is set higher, thereby increasing the rapid cooling (i.e., primary cooling) rate of the chill roller. After leaving the surface of the chill roller, the alloy is slowly cooled by the ambient gas at a relatively low rate (i.e., the secondary cooling process). In FIG. 3, the node of the cooling passage b corresponds to a point in time the alloy leaves the chill roller.

On the other hand, where the ambient gas has a relatively high pressure (corresponding to the passage a), the ambient gas brings about remarkable secondary cooling effects, thus shortening the time it takes for the alloy to pass the range where the $Nd_2Fe_{14}B$ phase is produced. Probably for this reason, the growth of the $Nd_2Fe_{14}B$ phase is suppressed and an $Nd_2Fe_{14}B$ phase with a small grain size can be obtained instead.

As can be seen, where the pressure of the ambient gas is set lower than 30 kPa, the $R_2Fe_{14}B$ phase, produced in the rapidly solidified alloy, will have an excessively large crystal grain size, thereby deteriorating the resultant magnet properties.

However, if the ambient gas has too high a pressure (i.e., higher than the atmospheric pressure), then the ambient gas would be trapped between the melt and the chill roller and affects the cooling rate considerably. As a result, the chill roller cannot cool the melt sufficiently. Then, an α-Fe phase with a very large grain size precipitates and therefore good hard magnetic properties cannot be attained.

According to the results of experiments the present inventors carried out, while the rapid cooling process is performed, the ambient gas should have its pressure controlled preferably at 30 kPa or more and the atmospheric pressure (=101.3 kPa) or less, more preferably between 30 kPa and 90 kPa, and even more preferably between 40 kPa and 60 kPa.

Where the ambient gas has a pressure falling within any of these preferred ranges, the surface velocity of the chill roller is preferably from 4 meters/second (=m/sec) to 50 n/sec. This is because if the roller surface velocity is lower than 4 m/sec, then the $R_2Fe_{14}B$ phase, included in the rapidly solidified alloy, will have excessively large crystal grains. In that case, the $R_2Fe_{14}B$ phase will further increase its size when thermally treated, thus possibly deteriorating the resultant magnetic properties.

On the other hand, if the roller surface velocity is higher than 50 m/sec, then the rapidly solidified alloy will be amorphized almost completely and substantially no $R_2Fe_{14}B$ phase will precipitate. Accordingly, while the alloy is heated and crystallized, the $R_2Fe_{14}B$ phase will have its grain size increased considerably to have a non-uniform structure. As a result, the magnetic properties cannot be improved.

According to the experimental results the present inventors obtained, the roller surface velocity is more preferably from 5 m/sec to 30 m/sec, even more preferably from 5 m/sec to 20 m/sec.

In the present invention, the rapidly solidified alloy has either a structure in which almost no $\alpha$-Fe phase with an excessively large grain size precipitates but an $R_2Fe_{14}B$ phase exists instead or a structure in which an $R_2Fe_{14}B$ phase and an amorphous phase coexist. Accordingly, a high-performance composite magnet, in which crystal grains in soft magnetic phases are dispersed finely or distributed uniformly in the grain boundary region between the hard magnetic phases, can be obtained. As used herein, the term "amorphous phase" means not only a phase in which the atomic arrangement is sufficiently disordered, but also a phase containing embryos for crystallization, extremely small crystalline regions (size: several nanometers or less), and/or atomic clusters. More specifically, the term "amorphous phase" means the phase that the crystal structure thereof cannot defined by an X-ray diffraction method or a TEM observation.

In the prior art, even when one tries to obtain a rapidly solidified alloy including 60 volume % or more of $R_2Fe_{14}B$ phase by rapidly cooling a molten alloy with a composition similar to that of the present invention, the resultant alloy will have a structure in which a lot of $\alpha$-Fe phase has grown coarsely. Thus, when the alloy is heated and crystallized after that, the $\alpha$-Fe phase will increase its grain size excessively. Once soft magnetic phases, including the $\alpha$-Fe phase, have grown too much, the magnet properties of the alloy deteriorate significantly, thus making it virtually impossible to produce a quality permanent magnet out of such an alloy.

Particularly with a material alloy containing boron at a relatively high percentage like the alloy of the present invention, even if the melt is cooled at a low rate, crystalline phases cannot be produced so easily according to the known method. This is because boron highly likely creates an amorphous phase. For that reason, in the prior art, even if one tries to make a rapidly solidified alloy including 60 volume % or more of $R_2Fe_{14}B$ phase by decreasing the cooling rate of the melt sufficiently, not only the $R_2Fe_{14}B$ phase but also the $\alpha$-Fe phase or its precursor will precipitate a lot. Thus, when that alloy is heated and crystallized after that, the $\alpha$-Fe phase will further grow to deteriorate the magnet properties of the alloy seriously.

Thus, it was widely believed that the best way of obtaining a nanocomposite magnet with a high coercivity is cooling a melt at an increased rate to amorphize most of it first and then forming a highly fine and uniform structure by heating the amorphous phases. This is because they took it for granted that there should be no other alternative but crystallizing the amorphous phases through an easily controllable heat treatment process to obtain a nanocomposite structure in which fine crystal grains are dispersed finely.

On this popular belief, W. C. Chan et al., reported a technique of obtaining $Nd_2Fe_{14}B$ and $\alpha$-Fe phases with grain sizes on the order of several tens nm. According to Chan's technique, La, which excels in producing the amorphous phases, is added to a material alloy. Next, the material alloy is melt quenched to obtain a rapidly solidified alloy mainly composed of the amorphous phases. And then the alloy is heated and crystallized. See W. C. Chan et al., "The Effects of Refractory Metals on the Magnetic Properties of $\alpha$-Fe/$R_2Fe_{14}B$-type Nanocomposites", IEEE Trans. Magn. No.5, INTER-MAG. 99, Kyongju, Korea, pp.3265-3267, 1999. This article also teaches that adding a refractory metal element such as Ti in a very small amount (e.g., 2 at %) improves the magnetic properties and that the mole fraction of Nd, rare earth element, is preferably increased from 9.5 at % to 11.0 at % to reduce the grain sizes of the $Nd_2Fe_{14}B$ and $\alpha$-Fe phases. The refractory metal is added to suppress borides like $R_2Fe_{23}B_3$ and $Fe_3B$ from being produced and to make a magnet consisting of $Nd_2Fe_{14}B$ and $\alpha$-Fe phases only.

In contrast, according to the present invention, Ti added can suppress not only the nucleation of the $\alpha$-Fe phase during the rapid solidification process but also the grain growth of soft magnetic phases like iron-based boride and $\alpha$-Fe phases during the heating/crystallizing process.

According to the present invention, even though the material alloy used includes a rare earth element at a relatively low percentage (i.e., 9.3 at % or less), a permanent magnet, exhibiting high remanence and coercivity and showing excellent loop squareness in its demagnetization curve, can be obtained.

As described above, the inventive magnet can have its coercivity increased by making the $Nd_2Fe_{14}B$ phase nucleate and grow faster and earlier in the cooling process so that the $Nd_2Fe_{14}B$ phase increases its volume percentage and yet by suppressing the grain coarsening of the soft magnetic phases. Also, the remanence thereof increases probably because Ti added can produce a boride phase (e.g., ferromagnetic iron-based borides) from the B-rich non-magnetic amorphous phases existing in the rapidly solidified alloy and can reduce the volume percentage of the non-magnetic amorphous phases remaining in the heated and crystallized alloy.

The rapidly solidified alloy obtained this way is preferably heated and crystallized if necessary to form a structure with three or more crystalline phases including $R_2Fe_{14}B$ compound, boride and $\alpha$-Fe phases. The heat treatment is preferably conducted with its temperature and duration controlled in such a manner that the $R_2Fe_{14}B$ phase will have an average crystal grain size of 10 nm to 200 nm and that the boride and $\alpha$-Fe phases will have an average crystal grain size of 1 nm to 50 nm. The $R_2Fe_{14}B$ phase normally has an average crystal grain size of 30 nm or more, which may be 50 nm or more depending on the conditions. On the other hand, the soft magnetic phases, like boride and $\alpha$-Fe phases, often have an average crystal grain size of 30 nm or less and typically several nanometers at most.

Figure 4:
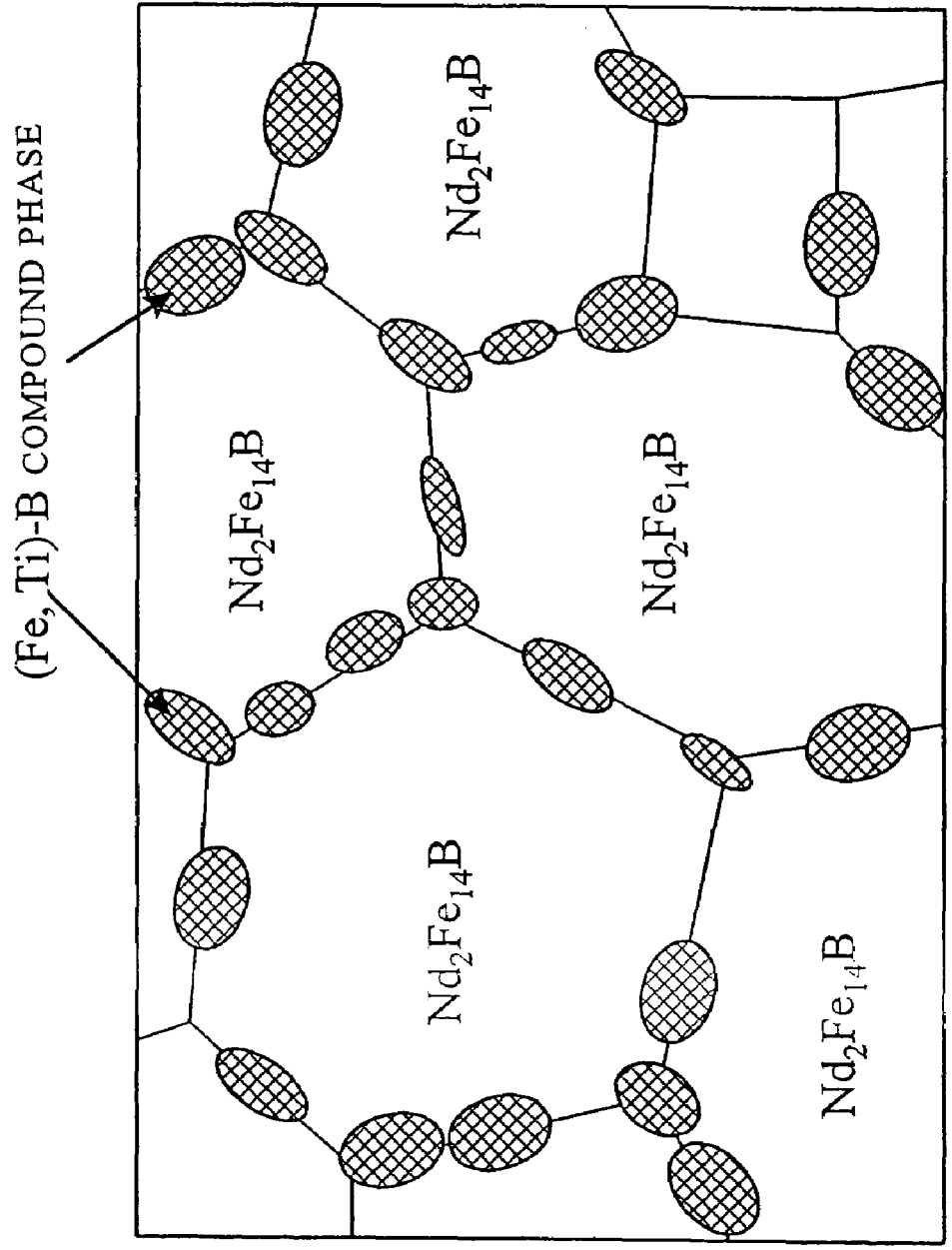
FIG. 4 schematically illustrates $R_2Fe_{14}B$ compound and (Fe,Ti)—B phases included in the magnet of the present invention.

In the resultant magnet, the $R_2Fe_{14}B$ phase has an average crystal grain size greater than that of the $\alpha$-Fe phase. FIG. 4 schematically illustrates the metal structure of this magnet. As shown in FIG. 4, fine crystal grains in soft magnetic phases are distributed in a grain boundary of relatively large crystal grains in the $R_2Fe_{14}B$ phase. Even though the $R_2Fe_{14}B$ phase has a relatively large average grain size, the soft magnetic phases have a relatively small average grain size. Accordingly, these constituent phases are coupled together through exchange interaction and the magnetization direction of the soft magnetic phases is constrained by the hard magnetic phase. Consequently, the alloy as a whole can show excellent loop squareness in its demagnetization curve.

In the inventive process, borides are easily produced as described above. The reason is probably as follows. When a rapidly solidified alloy, mostly composed of the $R_2Fe_{14}B$ phase, is made, the amorphous phases existing in the solidified alloy should contain an excessive amount of boron. Accordingly, when the alloy is heated and crystallized, that boron will bond to other elements easily, thus nucleating and growing in profusion. However, if that boron, contained in the amorphous phases before the heat treatment, bonds to other elements and produces compounds with low remanences, then the magnet as a whole will have its remanence decreased.

As a result of experiments, the present inventors discovered that only when Ti was added, the remanence did not decrease but rather increased as opposed to any other metal element additive such as V, Cr, Mn, Nb or Mo. Also, when M (e.g., Ti, in particular) was added, the loop squareness of the demagnetization curve was much better than any of the elements cited above did.

Accordingly, the present inventors believe that Ti plays a key role in suppressing the production of borides with low remanences. Particularly when relatively small amounts of B and Ti are included in a material alloy with the composition defined by the present invention, iron-based borides with ferromagnetic properties will easily grow during the alloy is heat-treated. In such a case, boron included in the non-magnetic amorphous phases would be absorbed into the iron-based borides. For that reason, the nonmagnetic amorphous phases, remaining in the alloy after the alloy has been heated and crystallized, decrease their volume percentage but the ferromagnetic crystalline phase increases its volume percentage instead, thus increasing the remanence Br.

Hereinafter, this point will be further detailed with reference to FIG. 5.

Figure 5:
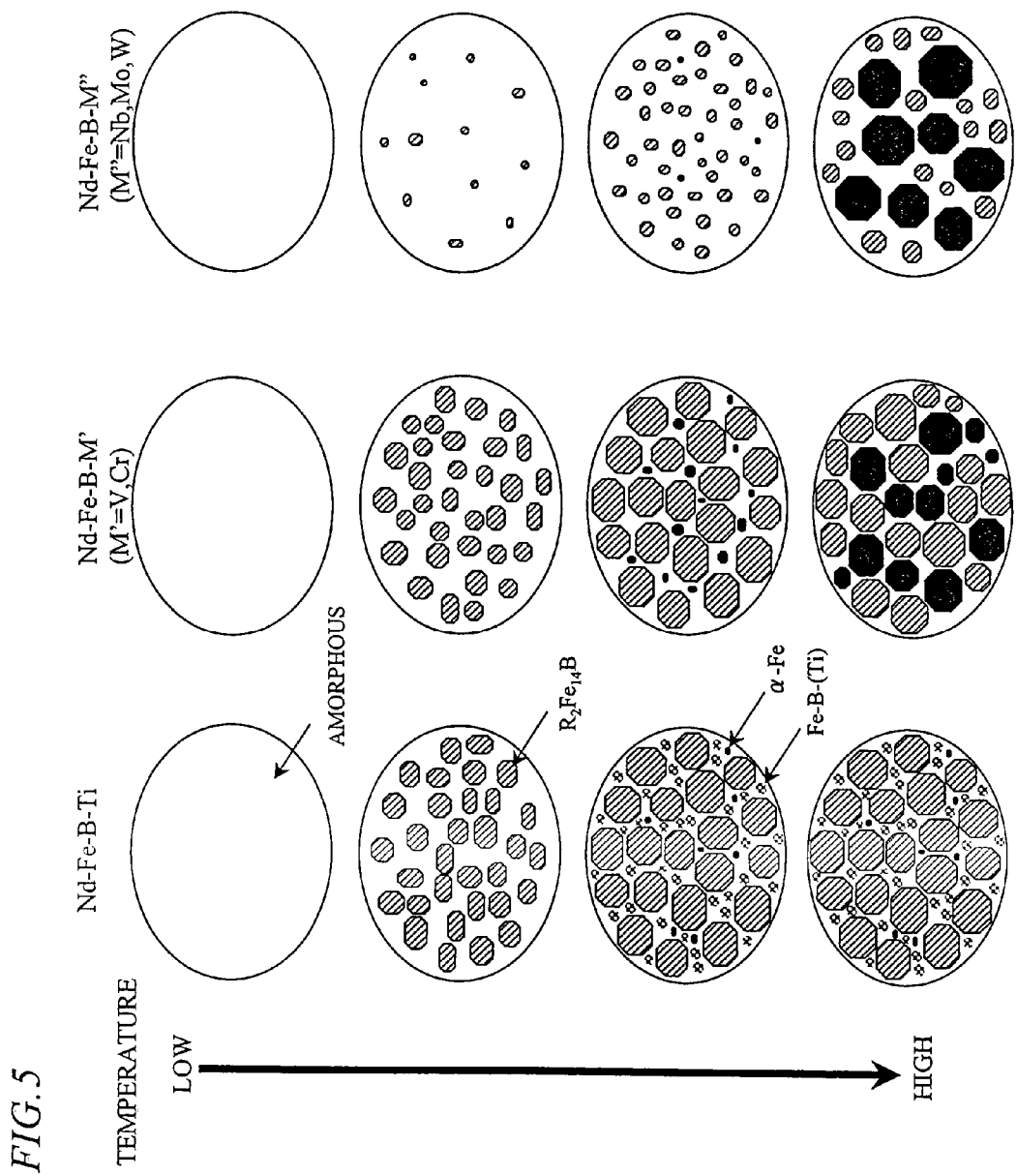
FIG. 5 schematically illustrates how three types of rapidly solidified alloys having a composition including additive Ti, a composition including V or Cr as an alternative additive and a composition including Nb, Mo or W as another alternative additive, respectively, change their microstructures during the crystallization processes thereof.

FIG. 5 schematically illustrates how three types of rapidly solidified alloys having a composition including additive Ti, a composition including V or Cr as an alternative additive and a composition including Nb, Mo or W as another alternative additive, respectively, change their microstructures during the crystallization processes thereof. Where Ti is added, the grain growth of the soft magnetic phases is suppressed in a temperature range exceeding the temperature at which the α-Fe phase grows rapidly. As a result, excellent hard magnetic properties can be maintained. In contrast, where any of the other metal elements (e.g., Nb, V, Cr, etc.) is added, the grain growth of the respective constituent phases advances remarkably and the exchange coupling among those phases weakens in the relatively high temperature range in which the α-Fe phase grows rapidly. As a result, the resultant demagnetization curves have their loop squareness decreased.

First, a situation where Nb, Mo or W is added will be described. In this case, if the alloy is thermally treated in a relatively low temperature range where no α-Fe phase precipitates, then good hard magnetic properties, including superior loop squareness of the demagnetization curve, are attainable. In an alloy that was heat-treated at such a low temperature, however, $R_2Fe_{14}B$ crystalline particles would be dispersed in the non-magnetic amorphous phases and the alloy does not have the nanocomposite magnet structure. Also, if the alloy is heat-treated at an even higher temperature, then the α-Fe phase nucleates and grows out of the amorphous phases. Unlike the situation where Ti is added, the α-Fe phase rapidly grows and increases its grain size excessively. As a result, the exchange coupling among the constituent phases weakens and the loop squareness of the demagnetization curve deteriorates considerably.

On the other hand, where Ti is added, a nanocomposite structure, including microcrystalline $R_2Fe_{14}B$, iron-based boride, and α-Fe can be obtained by heat-treating the alloy and the grains in the respective constituent phases are dispersed finely and uniformly. Also, the addition of Ti suppresses the grain growth of the α-Fe phase.

Where V or Cr is added, any of these additive metal elements is coupled anti-ferromagnetically with Fe to form a solid solution, thus decreasing the remanence considerably. The additive V or Cr cannot suppress the heat-treatment-induced grain growth sufficiently, either, and deteriorates the loop squareness of the demagnetization curve.

Accordingly, only when Ti is added, the crystal grain coarsening of the α-Fe phase can be suppressed appropriately and iron-based borides with ferromagnetic properties can be obtained. Furthermore, Ti, as well as B and C, plays an important role as an element that delays the crystallization of Fe initial crystals (i.e., γ-Fe that will be transformed into α-Fe) during the rapid cooling process and thereby facilitates the production of the supercooled liquid. Accordingly, even if the melt of the alloy including Ti is rapidly cooled and solidified at a relatively low cooling rate between about $10^{2°}$ C./sec and about $10^{5°}$ C./sec, a rapidly solidified alloy, in which the α-Fe phase has not precipitated too much and the microcrystalline $R_2Fe_{14}B$ and amorphous phases coexist, can be obtained. This greatly contributes to the cost reduction of nanocomposite magnets because this means that a strip casting method, particularly suitable for mass production, can be employed as a rapid cooling technique.

The strip casting technique is a highly productive and cost-effective method for obtaining a solidified alloy by rapidly cooling a melt of a material alloy. This is because in the strip casting method, the flow rate of the melt does not have to be controlled using the nozzle orifice but the melt may be poured directly from a turndish onto a chill roller. To amorphize the melt of an R—Fe—B rare earth alloy in a cooling rate range applicable to even the strip casting method, normally B (boron) should be added at 10 at % or more. However, if B added is that much, then not just non-magnetic amorphous phases but also α-Fe phase and/or soft magnetic $Nd_2Fe_{23}B_3$ phase will grow preferentially. That is to say, no uniform, microcrystalline structure can be obtained. As a result, the volume percentage of the ferromagnetic phases decreases, the remanence drops and the volume percentage of the $Nd_2Fe_{14}B$ phase also decreases. Consequently, the coercivity decreases noticeably. However, if Ti is added as in the present invention, then the remanence increases.

It should be noted that a rapidly solidified alloy, including the $Nd_2Fe_{14}B$ phase at a high volume percentage, could improve the resultant magnet properties more easily than a solidified alloy including the amorphous phases at a high volume percentage. Accordingly, the volume percentage of the $Nd_2Fe_{14}B$ phase to the entire solidified alloy is preferably 50 volume % or more, more specifically 60 volume % or more, which value was obtained by Mossbauer spectroscopy.

Preferred Composition

Q is either B (boron) only or a combination of B and C (carbon). The molar fraction of C to Q is preferably 0.25 or less.

If the mole fraction x of Q is 10 at % or less, then it is difficult to make the desired rapidly solidified alloy, in which the microcrystalline $R_2Fe_{14}B$ and amorphous phases coexist, at the low cooling rate between about $10^{2°}$ C./sec to about $10^{5°}$ C./sec. Also, even if the alloy is heat-treated after that, the resultant $H_{cJ}$ will be as low as less than 480 kA/m. In addition, the strip casting method, which is one of the most cost-effective techniques among various rapid cooling methods, cannot be adopted in that case, and the price of the resultant permanent magnet product rises unintentionally. On the other hand, if the mole fraction x of Q exceeds 20 at %, then the volume percentage of the amorphous phases, remaining in the alloy even after the alloy has been heated and crystallized, increases. In addition, the percentage of the α-Fe phase, which has a higher saturation magnetization than any other constituent phase, decreases and the remanence $B_r$ drops. In view of these respects, the mole fraction x of Q is preferably greater than 10 at % and equal to or less than 20 at %, more preferably greater than 10 at % and less than 17 at %.

R is at least one element selected from the rare earth elements and/or yttrium (Y). Preferably, R includes substantially no La and substantially no Ce, because the existence of La or Ce decreases the coercivity and the loop squareness of the demanetization curve. However, there is no problem of degrading the magnetic properties if very small amounts (i.e., 0.5 at % or less) of La and Ce exist as inevitable impurities. Therefore, the term "substantially no La (Ce)" or "substantially excluding La (Ce)" means that the content of La (Ce) is 0.5 at % or less. R preferably includes Pr or Nd as an indispensable element, part of which may be replaced with Dy and/or Th. If the mole fraction y of R is less than 6 at %, then fine crystal grains with the microcrystalline $R_2Fe_{14}B$ structure, which is needed for expressing the coercivity, do not crystallize sufficiently and a coercivity $H_{cJ}$ of 480 kA/m or more cannot be obtained. On the other hand, if the mole fraction y of R is equal to or greater than 10 at %, then the percentages of the iron-based borides and a Fe with ferromagnetic properties both decrease. For these reasons, the mole fraction y of the rare earth element R is preferably equal to or greater than 6 at % and less than 10 at % (e.g., from 6 at % to 9.5 at %), more preferably 8 at % to 9.3 at %, and most preferably from 8.3 at % to 9.0 at %.

The additive element(s) M must include Ti and may further include Zr and/or Hf optionally. To attain the above effects, Ti is indispensable. As described above, the additive Ti increases the coercivity $H_{cJ}$, remanence $B_r$ and maximum energy product $(BH)_{max}$ and improves the loop squareness of the demagnetization curve.

If the mole fraction z of the metal element(s) M is less than 0.5 at %, then the above effects cannot be attained fully even though Ti is added. Nevertheless, if the mole fraction z of the metal element(s) M exceeds 12 at %, then the volume percentage of the amorphous phases, remaining in the alloy even after the alloy has been heated and crystallized, increases and the remanence $B_r$ likely drops. In view of these respects the mole fraction z of the metal element(s) M is preferably from 0.5 at % to 12 at %. The lower limit of a more preferable z range is 1.0 at % and the upper limit thereof is 8.0 at %. The upper limit of an even more preferable z range is 6.0 at %.

Also, the higher the mole fraction x of Q, the more likely the amorphous phases, including an excessive amount of Q (e.g., boron), are formed. Accordingly, the mole fraction z of the metal element(s) M should preferably be set higher because of this reason also. Specifically, the mole fractions x and z should be adjusted preferably to meet the inequality $z/x \geq 0.1$, more preferably to meet the inequality $z/x \geq 0.15$.

As described above, the metal element(s) M must include Ti because Ti acts very favorably. In this case, the atomic percentage of Ti to the total metal element(s) M is preferably 70 at % or more and more preferably 90 at % or more.

The balance of the alloy, other than the elements Q, R and M, may be Fe alone. Or, part of Fe may be replaced with at least one transition metal element T selected from the group consisting of Co and Ni, because the desired hard magnetic properties are also attainable. However, if more than 50% of Fe is replaced with T, then a high remanence $B_r$ of 0.7 T or more cannot be obtained. For that reason, the percentage of Fe replaced is preferably from 0% to 50%. Also, by replacing part of Fe with Co, the loop squareness of the demagnetization curve improves and the Curie temperature of the $R_2Fe_{14}B$ phase rises, thus increasing the thermal resistance of the alloy. The percentage of Fe replaced with Co is preferably from 0.5% to 40%.

Hereinafter, preferred embodiments of the present invention will be described with reference to the accompanying drawings.

Melt Quenching Machine

Figure 6A:
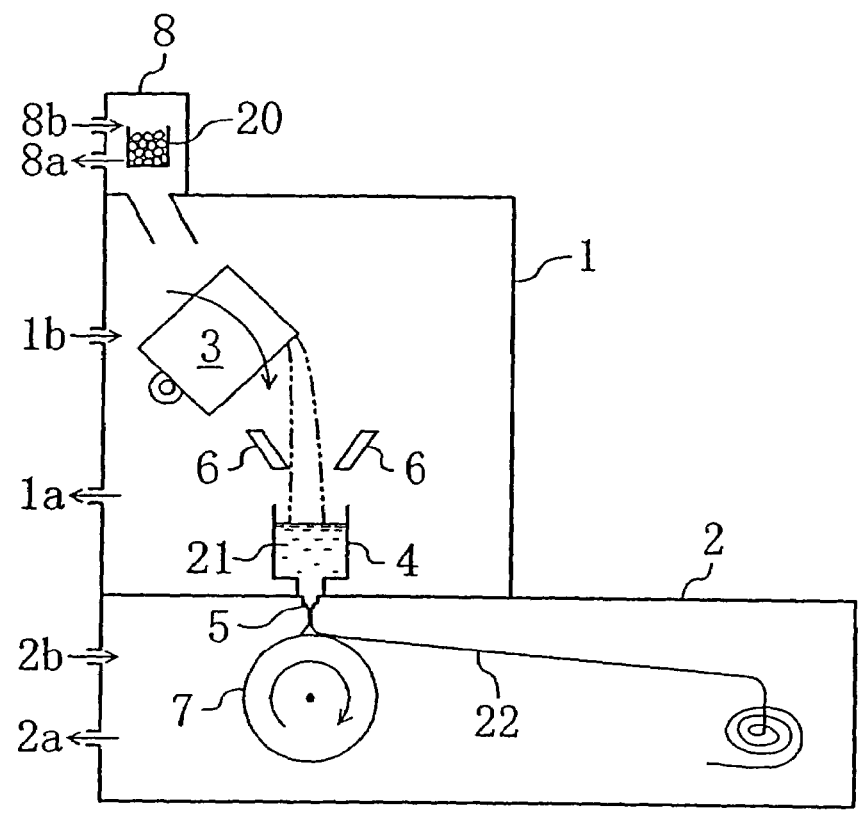
FIG. 6A is a cross-sectional view illustrating an overall arrangement for a melt quenching machine for use to make a rapidly solidified alloy for the iron-based rare earth alloy magnet of the present invention.
Figure 6B:
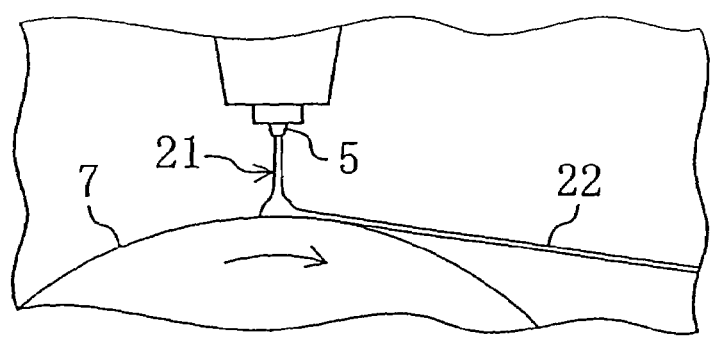
FIG. 6B illustrates part of the machine shown in FIG. 6A, where a melt is quenched and rapidly solidified, to a larger scale.

In this embodiment, a material alloy is prepared using a melt quenching machine such as that shown in FIGS. 6A and 6B. The alloy preparation process is performed within an inert gas environment to prevent the material alloy, which contains rare earth element R and Fe that are easily oxidizable, from being oxidized. The inert gas may be either a rare gas of helium or argon, for example or nitrogen. The rare gas of helium or argon is preferred to nitrogen, because nitrogen reacts with the rare earth element R relatively easily.

The machine shown in FIG. 6A includes material alloy melting and quenching chambers 1 and 2, in which a vacuum or an inert gas environment is created at an adjustable pressure. Specifically, FIG. 6A illustrates an overall arrangement for the machine, while FIG. 6B illustrates part of the machine to a larger scale.

As shown in FIG. 6A, the melting chamber 1 includes a melting furnace 3, a melt crucible 4 with a teeming nozzle 5 at the bottom and an airtight compounded material feeder 8. A material alloy 20, which has been compounded to have a desired magnet alloy composition and supplied from the feeder 8, is melted in the melting furnace 3 at an elevated temperature. A melt 21 of the material alloy 20 is poured into the crucible 4, which is provided with a heater (not shown) for keeping the temperature of the melt teemed therefrom at a predetermined level.

The quenching chamber 2 includes a rotating chill roller 7 for rapidly cooling and solidifying the melt 21 that has been dripped through the teeming nozzle 5.

In this machine, the environment and pressure inside the melting and quenching chambers 1 and 2 are controllable within prescribed ranges. For that purpose, ambient gas inlet ports 1b, 2b and 8b and outlet ports 1a, 2a and 8a are provided at appropriate positions of the machine. In particular, the gas outlet port 2a is connected to a pump to control the absolute pressure inside the quenching chamber 2 within a range from 30 kPa to atmospheric pressure.

The melting furnace 3 may be inclined at a desired angle to pour the melt 21 through a funnel 6 into the crucible 4. The melt 21 is heated in the crucible 4 by the heater (not shown).

The teeming nozzle 5 of the crucible 4 is positioned on the boundary wall between the melting and quenching chambers 1 and 2 to drip the melt 21 in the crucible 4 onto the surface of the chill roller 7, which is located under the nozzle 5. The orifice diameter of the nozzle 5 may be in a range from 0.5 mm to 2.0 mm, for example. If the viscosity of the melt 21 is high, then the melt 21 cannot flow through the nozzle 5 easily. In this embodiment, however, the pressure inside the quenching chamber 2 is kept lower than the pressure inside the melting chamber 1. Accordingly, there exists an appropriate pressure difference between the melting and quenching chambers 1 and 2, and the melt 21 can be teemed smoothly.

To attain a good thermal conductivity, the chill roler 7 may be made of Al alloy, Cu alloy, carbon steel, brass, W, Mo or bronze. However, the roller 7 is preferably made of Cu, because Cu realizes a sufficient mechanical strength at a reasonable cost. The diameter of the roller 7 may be in a range from 300 mm to 500 mm, for instance. The water-cooling capability of a water cooler provided inside the roller 7 is calculated and adjustable based on the latent heat of solidification and the volume of the melt teemed per unit time.

The machine shown in FIGS. 6A and 6B can rapidly solidify 10 kg of material alloy in 10 to 20 minutes, for example. The alloy solidified in this manner is in the form of a thin strip (or ribbon) 22 with a thickness of 100 µm to 300 µm and a width of 2 mm to 3 mm.

Melt Quenching Process

First, the melt 21 of the material alloy, which is represented by the general formula described above, is prepared and stored in the crucible 4 of the melting chamber 1 shown in FIG. 6A. Next, the melt 21 is dripped through the teeming nozzle 5 onto the chill roller 7 to come into contact with, and be rapidly cooled and solidified by, the roller 7 within a low-pressure Ar environment. In this case, an appropriate rapid solidification technique, making the cooling rate controllable precisely, should be adopted.

In the illustrated embodiment, the melt 21 should be quenched and solidified preferably at a rate between $1 \times 10^{2 \circ}$ C./sec and $1 \times 10^{8 \circ}$ C./sec, more preferably at a rate between $1 \times 10^{4 \circ}$ C./sec and $1 \times 10^{6 \circ}$ C./sec.

An interval during which the melt 21 is quenched by the chill roller 7 is equivalent to an interval between a point in time the alloy comes into contact with the circumference of the rotating chill roller 7 and a point in time the alloy leaves the roller 7. In the meantime, the alloy has its temperature decreased to become a supercooled liquid. Thereafter, the supercooled alloy leaves the roller 7 and travels within the inert gas environment. While the thin-strip alloy is travelling, the alloy has its heat dissipated into the ambient gas. As a result, the temperature of the alloy further drops. According to the present invention, the pressure of the ambient gas is in the range from 30 kPa to atmospheric pressure. Thus, the heat of the alloy can be dissipated into the ambient gas even more effectively and the $Nd_2Fe_{14}B$ phase can nucleate and grow uniformly in the alloy. It should be noted that unless an appropriate amount of element M (e.g., Ti) has been added to the material alloy, then the α-Fe phase nucleates and grows faster and earlier in the rapidly solidified alloy, thus deteriorating the resultant magnet properties.

In this embodiment, the surface velocity of the roller 7 is adjusted to fall within a range from 10 m/sec to 30 m/sec and the pressure of the ambient gas is set to 30 kPa or more to enhance the secondary cooling effects caused by the ambient gas. In this manner, a rapidly solidified alloy, including 60 volume percent or more of $R_2Fe_{14}B$ phase with an average grain size of as small as 80 nm or less, is prepared.

In the present invention, the technique of rapidly cooling the melt is not limited to the single roller melt-spinning method described above. Examples of other applicable techniques include twin roller method, gas atomization method, strip casting method requiring no flow rate control using nozzle or orifice, and rapid cooling technique utilizing the roller and atomization methods in combination.

Among these rapid cooling techniques, the strip casting method results in a relatively low cooling rate, i.e., $10^{2 \circ}$ C./sec to $10^{5 \circ}$ C./sec. According to this embodiment, by adding an appropriate volume of Ti to the material alloy, a rapidly solidified alloy, most of which has a structure including no Fe initial crystals, can be obtained even by the strip casting method. The process cost of the strip casting method can be about half or less of any other rapid cooling method. Accordingly, in preparing a large quantity of rapidly solidified alloy, the strip casting method is much more effective than the single roller method, and is suitably applicable to mass production. However, if no element M is added to the material alloy or if Cr, V, Mn, Mo, Ta and/or W are/is added thereto instead of Ti, then a metal structure including a lot of Fe initial crystals will be produced even in the rapidly solidified alloy prepared by the strip casting method. Consequently, the desired metal structure cannot be obtained.

Heat Treatment

In this embodiment, the heat treatment is conducted within an argon environment. Preferably, the alloy is heated at a temperature rise rate of 5° C./sec to 20° C./sec, kept at a temperature between 550° C. and 850° C. for a period of time from 30 seconds to 20 minutes and then cooled to room temperature. This heat treatment results in nucleation and/or crystal growth of metastable phases in a remaining amorphous phase, thus forming a nanocomposite microcrystalline structure. According to the present invention, the microcrystalline $Nd_2Fe_{14}B$ phase already accounts for 60 volume % or more of the total alloy when the heat treatment is started. Thus, when the heat treatment is conducted under these conditions, soft magnetic phases will not increase their size too much and the soft magnetic phases will be dispersed finely and uniformly in a grain boundary between the microcrystalline $Nd_2Fe_{14}B$ grains.

If the heat treatment temperature is lower than 550° C., then a lot of amorphous phases may remain even after the heat treatment and the resultant coercivity may not reach the desired level depending on the conditions of the rapid cooling process. On the other hand, if the heat treatment temperature exceeds 850° C., the grain growth of the respective constituent phases will advance too much, thus decreasing the remanence $B_r$ and deteriorating the loop squareness of the demagnetization curve. For these reasons, the heat treatment temperature is preferably from 550° C. to 850° C., more preferably 570° C. to 820° C.

In the present invention, the ambient gas causes the secondary cooling effects so that a sufficient amount of crystal grains in the $Nd_2Fe_{14}B$ phase crystallize uniformly and finely in the rapidly solidified alloy. Accordingly, even if the rapidly solidified alloy is not heat-treated, the solidified alloy itself can exhibit good enough magnet properties. That is to say, the heat treatment for crystallization is not indispensable for the present invention. However, to further improve the magnet properties, the heat treatment is preferably conducted. In addition, even though the heat treatment is carried out at lower temperatures than the known process, the magnet properties still can be improved sufficiently.

To prevent the alloy from being oxidized, the heat treatment is preferably conducted within an inert gas (e.g., Ar or $N_2$ gas) environment. The heat treatment may also be performed within a vacuum of 0.1 kPa or less.

Before the heat treatment, the rapidly solidified alloy may include metastable phases such as $Fe_3B$, $Fe_{23}B_6$, and $R_2Fe_{23}B_3$ phases in addition to the $R_2Fe_{14}B$ compound and amorphous phases. In that case, when the heat treatment is over, the $R_2Fe_{23}B_3$ phase will have disappeared. Instead, crystal grains of an iron-based boride (e.g., $Fe_{23}B_6$), showing a saturation magnetization equal to or even higher than that of $R_2Fe_{14}B$ phase, or α-Fe phase can be grown.

In the present invention, even if the soft magnet phases like the α-Fe phase exist in the resultant magnet, excellent magnetic properties still can be attained because the soft and hard magnetic phases are magnetically coupled together through exchange interaction.

After the heat treatment, the $Nd_2Fe_{14}B$ phase should have an average crystal grain size of 300 nm or less, which is a single magnetic domain size. The average crystal grain size of the $Nd_2Fe_{14}B$ phase is preferably from 20 nm to 150 nm, more preferably 20 nm to 100 nm. On the other hand, if the boride and α-Fe phases have an average crystal grain size of more than 50 nm, then the exchange interaction among the respective constituent phases weakens, thus deteriorating the loop squareness of the demagnetization curve and decreasing $(BH)_{max}$. And if the average crystal grain size of these phases is less than 1 nm, then a high coercivity cannot be attained. For these reasons, the soft magnet phases, such as the boride and α-Fe phases, should preferably have an average crystal grain size of 1 nm to 50 nm, more preferably 30 nm or less.

It should be noted that the thin strip of the rapidly solidified alloy may be roughly cut or pulverized before subjected to the heat treatment.

After heat-treated, the resultant magnetic alloy is finely pulverized to obtain a magnet powder. Then, various types of bonded magnets can be made from this powder by performing known process steps on this powder. In making a bonded magnet, the magnet powder of the iron-based rare earth alloy is compounded with an epoxy or nylon resin binder and then molded into a desired shape. At this time, a magnet powder of any other type (e.g., an Sm—Fe—N magnet powder or hard ferrite magnet powder) may be mixed with the nanocomposite magnet powder.

Using the resultant bonded magnet, motors, actuators and other rotating machines can be produced.

When the magnet powder of the present invention is used for an injection-molded bonded magnet, the powder is preferably pulverized to have a mean particle size of 200 μm or less, more preferably from 30 μm to 150 μm. On the other hand, where the inventive magnet powder is used for a compression-molded bonded magnet, the powder is preferably pulverized to have a mean particle size of 300 μm or less, more preferably from 30 μm to 250 μm and even more preferably 50 μm to 200 μm with a bimodal size distribution.

It should be noted that if the powder obtained is subjected to a surface treatment (e.g., coupling treatment, conversion coating or plating), then the powder for a bonded magnet can have its moldability improved no matter how the powder is molded. In addition, the resultant bonded magnet can have its anticorrosiveness and thermal resistance both increased. Alternatively, after a bonded magnet has been once formed by molding the powder into a desired shape, the surface of the magnet may also be treated, e.g., covered with a plastic or conversion coating or plated. This is because anticorrosiveness and thermal resistance of the bonded magnet can also be increased in that case.

EXAMPLES

First, examples and comparative examples, in which the mole fractions x and z of Q and M meet 10 at %<x<15 at % and 0.1 at %<z<10 at %, respectively, will be described.

For each of samples Nos. 1 to 12 shown in the following Table 1, the respective materials B, C, Fe, Co, Ti, Nd, Pr, Tb and Dy with purities of 99.5% or more were weighed so that the sample had a total weight of 30 g and then the mixture was injected into a crucible of quartz. In Table 1, samples Nos. 1 to 8 represent examples of the present invention, while samples Nos. 9 to 12 represent comparative examples:

TABLE 1

| | Composition (at %) | | | | Roller Velocity | Heat Treatment temperature |
|---|---|---|---|---|---|---|
| | Fe | Q | R | M | m/sec | ° C. |
| 1 | Fe79 | B11 | Nd9 | Ti1 | 20.0 | 660 |
| 2 | Fe78.7 | B10.3 | Nd9 | Ti2 | 12.0 | 700 |
| 3 | Fe76.7 | B10.3 | Nd9 | Ti4 | 9.0 | 760 |
| 4 | Fe69 + Co3 | B14 | Nd3 + Pr3 | Ti6 | 9.0 | 740 |
| 5 | Fe68 + Co3.5 | B7 + C4 | Nd9.5 | Ti8 | 7.0 | 780 |
| 6 | Fe78.7 | B10.3 | Nd8 + Dy1 | Ti2 | 12.0 | 720 |
| 7 | Fe78.7 | B5 + C5.3 | Nd8 + Tb1 | Ti2 | 12.0 | 720 |
| 8 | Fe65.7 + Co10 | B10.3 | Nd9 | Ti5 | 8.0 | 720 |
| 9 | Fe81 | B12 | Nd7 | — | 30.0 | 660 |
| 10 | Fe80 | B14 | Nd6 | — | 20.0 | 680 |
| 11 | Fe80.7 | B10.3 | Nd9 | — | 25.0 | 660 |
| 12 | Fe76.7 | B10.3 | Nd11 | Ti2 | 12.0 | 710 |

In Table 1, the column "Q" includes "B7+C4", for example, which means that 7 at % of boron (B) and 4 at % of carbon (C) were added. Also, the column "R" includes "Nd3.+Pr3", for example, which means that 3 at % of Nd and 3 at % of Pr were added.

The quartz crucible used for preparing the melt had an orifice with a diameter of 0.8 mm at the bottom. Accordingly, the alloy including these materials was melted in the quartz crucible to be a melt, which was then dripped down through the orifice. The material alloy was melted by a high frequency heating method within an argon environment at a pressure of 1.33 kPa. In the illustrated examples, the temperature of the melt was set to 1500° C.

The surface of the melt was pressurized with Ar gas at 26.7 kPa, thereby propelling the melt against the outer circumference of a copper chill roller, which was located 0.7 mm under the orifice. The roller was rotated at a high velocity while being cooled inside so that the outer circumference would have its temperature kept at around room temperature. Accordingly, the melt, which had been dripped down through the orifice, came into contact with the surface of the chill roller to have its heat dissipated therefrom while being forced to rapidly move on the rotating chill roller. The melt was continuously expelled through the orifice onto the surface of the roller. Thus, the rapidly solidified alloy was in the shape of an elongated thin strip (or ribbon) with a width of 2 to 3 mm and a thickness of 20 to 50 μm.

In the (single) roller method adopted in these examples, the cooling rate is determined by the circumference velocity of the roller and the weight of the melt dripped per unit time, which depends on the diameter (or cross-sectional area) of the orifice and the pressure on the melt. In the present examples, the orifice has a diameter of 0.8 mm, a pressure of 26.7 kPa was placed on the melt and the dripping rate was from about 0.5 kg/min to 1 kg/min.

The circumference velocity of the roller was changed as shown in Table 1.

Next, the rapidly solidified alloy samples Nos. 1 to 12 were heat-treated within Ar gas. Specifically, the rapidly solidified alloys were kept at the respective heat treatment temperatures shown on the rightmost column in Table 1 for 6 minutes and then cooled to room temperature. Thereafter, the magnetic properties of these samples were measured using a vibrating sample magnetometer. The results are shown in the following Table 2:

TABLE 2

| | Magnetic properties | | |
|---|---|---|---|
| | $B_r$ (T) | $H_{CJ}$ (kA/m) | $(BH)_{max}$ (kJ/m³) |
| 1 | 0.86 | 490 | 94 |
| 2 | 0.85 | 605 | 118 |
| 3 | 0.85 | 695 | 111 |
| 4 | 0.88 | 520 | 102 |
| 5 | 0.84 | 740 | 106 |
| 6 | 0.84 | 658 | 101 |
| 7 | 0.83 | 682 | 98 |
| 8 | 0.87 | 730 | 125 |
| 9 | 0.80 | 22 | 4 |
| 10 | 0.69 | 8 | — |
| 11 | 0.86 | 479 | 80 |
| 12 | 0.74 | 955 | 88 |

As can be seen from Table 2, the examples of the present invention showed magnetic properties that were superior to those of the comparative examples. Also, even if Ti had been added, its beneficial effects (i.e., a highly uniform distribution of fine crystal grains) could not be attained fully and the remanence $B_r$ dropped noticeably where the mole fraction y of the rare earth element R (Nd) was out of the range 6 at %≦y<10 at %.

Figure 7:
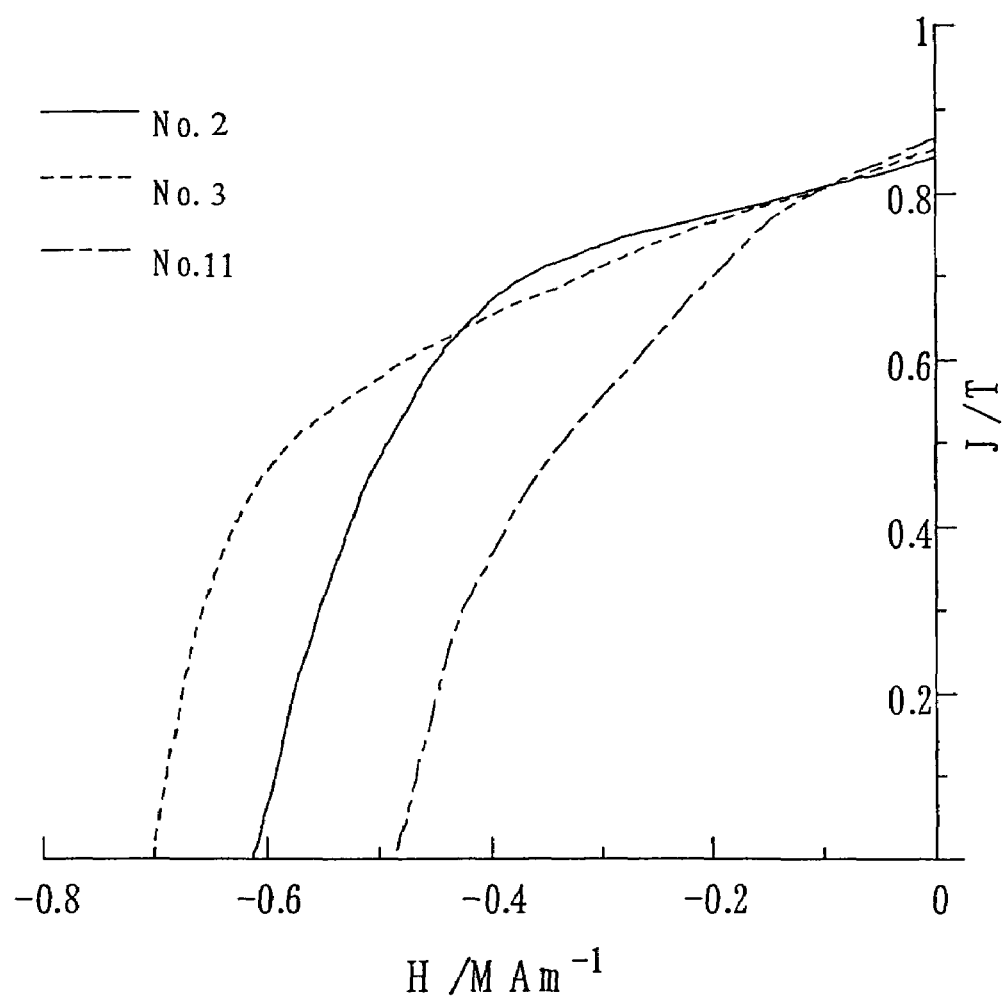
FIG. 7 is a graph illustrating the demagnetization curves (i.e., the second quadrant portion of the hysteresis loop) of samples Nos. 2 and 3 and No. 11.

FIG. 7 illustrates the demagnetization curves of samples Nos. 2 and 3 (examples of the present invention) and sample No. 11 (comparative example). In FIG. 7, the ordinate represents the remanence while the abscissa represents the demagnetization field strength.

As can be seen from FIG. 7, the demagnetization curves of the examples have loop squareness much better than that of the comparative example. The comparative example showed deteriorated loop squareness probably because the crystal grain size was large.

Next, each of samples Nos. 1 to 8 representing the examples of the present invention was analyzed using Cu—Kα characteristic X-radiation to identify the respective constituent phases thereof. As a result, the existence of $Fe_{23}B_6$ and α-Fe phases, as well as $R_2Fe_{14}B$ phase, was confirmed. As for samples Nos. 9 and 10 representing two of the comparative examples on the other hand, no $R_2Fe_{14}B$ phase, which is a hard magnetic phase, was identified and it was found that those samples consisted of $R_2Fe_{23}B3$ and α-Fe phases, which are soft magnetic phases. In sample No. 11 representing another comparative example, a mixture of hard magnetic $R_2Fe_{14}B$ and soft magnetic α-Fe phases was identified but no ferromagnetic iron-based borides were found.

Figure 8:
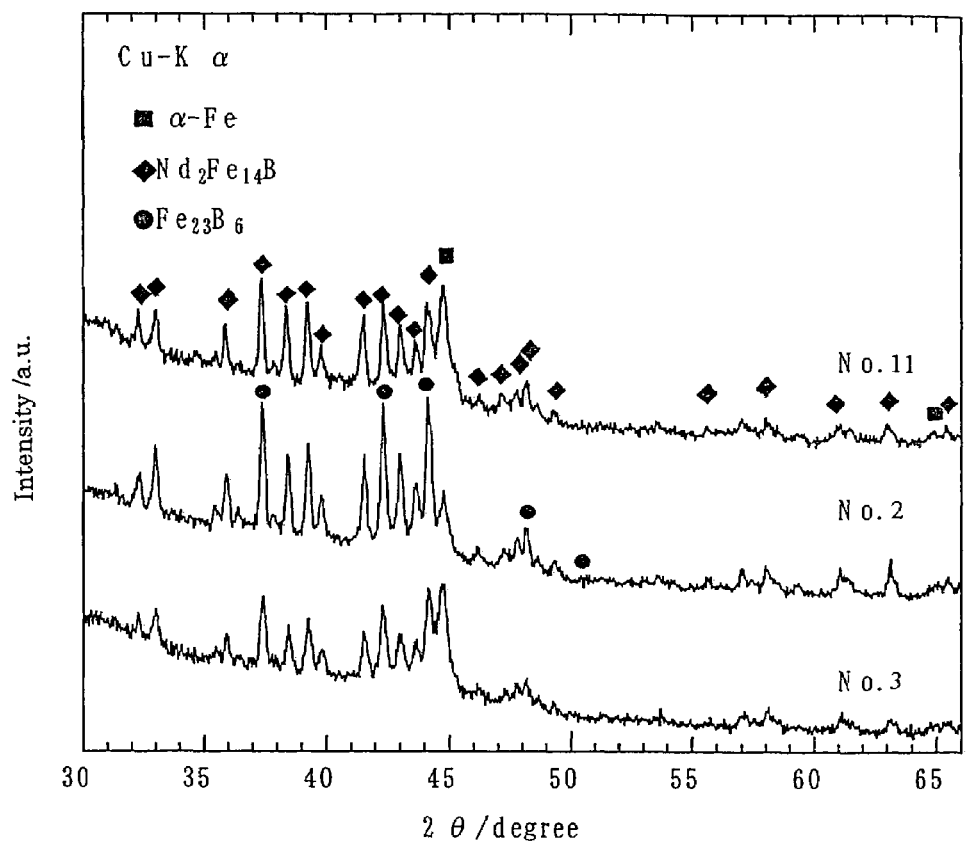
FIG. 8 is a graph illustrating the XRD patterns of the heat-treated samples Nos. 2, 3 and 11.

FIG. 8 illustrates the XRD patterns of the heat-treated samples Nos. 2 and 3 (examples of the present invention) and No. 11 (comparative example). In FIG. 8, the ordinate represents the intensity of diffraction, while the abscissa represents the angle of diffraction.

As can be seen from FIG. 8, it was found that a metallic structure, comprised of $Nd_2Fe_{14}B$, α-Fe and $Fe_{23}B_6$ phases, had been formed in the examples of the present invention. As for the comparative example on the other hand, only $Nd_2Fe_{14}B$ and α-Fe phases were identified. Accordingly, it is believed that an excessive amount of B existed in the resultant alloy structure.

Using a transmission electron microscope (TEM), the metal structure after the heat treatment was investigated on samples Nos. 1 to 8 representing the examples of the present invention. As a result, the present inventors found that each of these samples had a nanometer-scaled crystalline structure with an average crystal grain size of 10 to 25 nm. The present inventors also analyzed sample No. 2 using an atom probe to find that part of Ti had been replaced with Fe contained in the respective constituent phases but that most of Ti existed in the grain boundary phases Next, other examples of the present invention and reference examples will be described. In each of the examples of the present invention, the mole fractions x and z of Q and M meet 15 at %≦x≦20 at % and 3.0 at %<z<12 at %, respectively. On the other hand, in the reference examples, the mole fraction x of Q does not meet 15 at %≦x≦20 at %, nor does the mole fraction z of M meet 3.0 at %<z<12 at %.

For each of samples Nos. 13 to 19 shown in the following Table 3, the respective materials B, C, Fe, Co, Ti and Nd with purities of 99.5% or more were weighed so that the sample had a total weight of 30 g and then the mixture was injected into a crucible of quartz.

TABLE 3

| | Composition (at %) | | | | Roller Surface velocity m/sec | Heat treatment temperature ° C. |
|---|---|---|---|---|---|---|
| | Fe | Q | R | M | | |
| 13 | Fe68.5 | B15 | Nd8.5 | Ti8 | 20 | 680 |
| 14 | Fe70.0 + Co2.5 | B15 | Nd8.5 | Ti4 | 20 | 680 |
| 15 | Fe71.5 | B14 + C1 | Nd8.5 | Ti5 | 12 | 700 |
| 16 | Fe66.5 | B15 | Nd8.5 | Ti10 | 25 | 720 |
| 17 | Fe76.5 | B15 | Nd8.5 | — | 30 | 760 |
| 18 | Fe74.5 | B15 | Nd8.5 | Ti2 | 15 | 780 |
| 19 | Fe75.5 | B15 | Nd6.5 | Ti3 | 20 | 780 |

In Table 3, the column "M" includes "Ti8", for example, which means that 8 at % of Ti was added to the material alloy, and "-" means that no Ti was added thereto.

Samples Nos. 13 to 19 were subjected to a rapid solidification process under the same conditions as those specified for samples Nos. 1 to 12.

The resultant rapidly solidified alloy structures were analyzed using Cu—Kα characteristic X-radiation. As a result, each of these samples was found an amorphous alloy. The material alloy amorphized easily because the alloy contained B at a relatively high concentration.

Next, the rapidly solidified alloy samples Nos. 13 to 19 were heat-treated within Ar gas. Specifically, the rapidly solidified alloys were kept at the respective heat treatment temperatures shown on the rightmost column in Table 3 for 6 minutes and then cooled to room temperature. Thereafter, the magnetic properties of these samples were measured using a vibrating sample magnetometer. The results are shown in the following Table 4:

TABLE 4

| | Magnetic properties | | |
|---|---|---|---|
| | $B_r$ (T) | $H_{cJ}$ (kA/m) | $(BH)_{max}$ (kJ/m$^3$) |
| 13 | 0.83 | 957 | 111 |
| 14 | 0.79 | 906 | 105 |
| 15 | 0.82 | 826 | 104 |
| 16 | 0.70 | 1073 | 78 |
| 17 | 0.63 | 197 | 28 |
| 18 | 0.71 | 462 | 56 |
| 19 | 1.0 | 30 | 12 |

As can be seen from Table 4, samples Nos. 13 to 16 representing examples of the present invention showed magnetic properties that were superior to those of samples Nos. 17 to 19 representing the reference examples.

Figure 9:
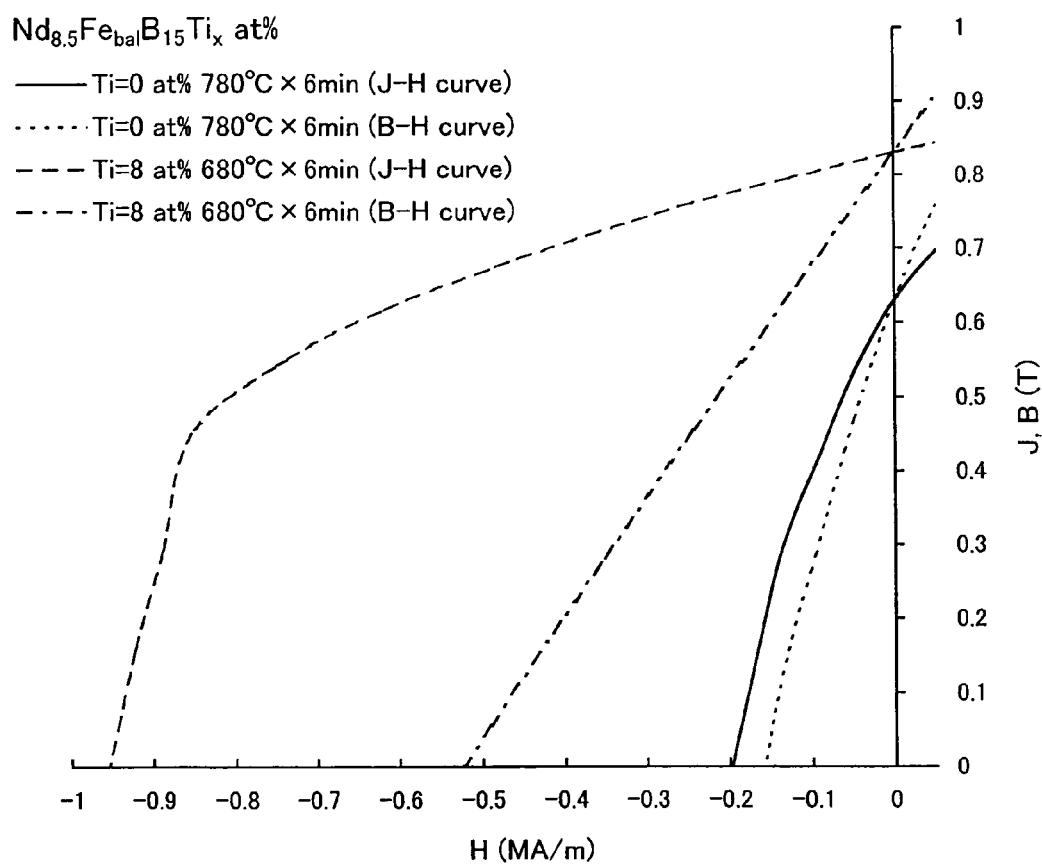
FIG. 9 is a graph illustrating the demagnetization curves of samples Nos. 13 and 17, respectively.
Figure 10:
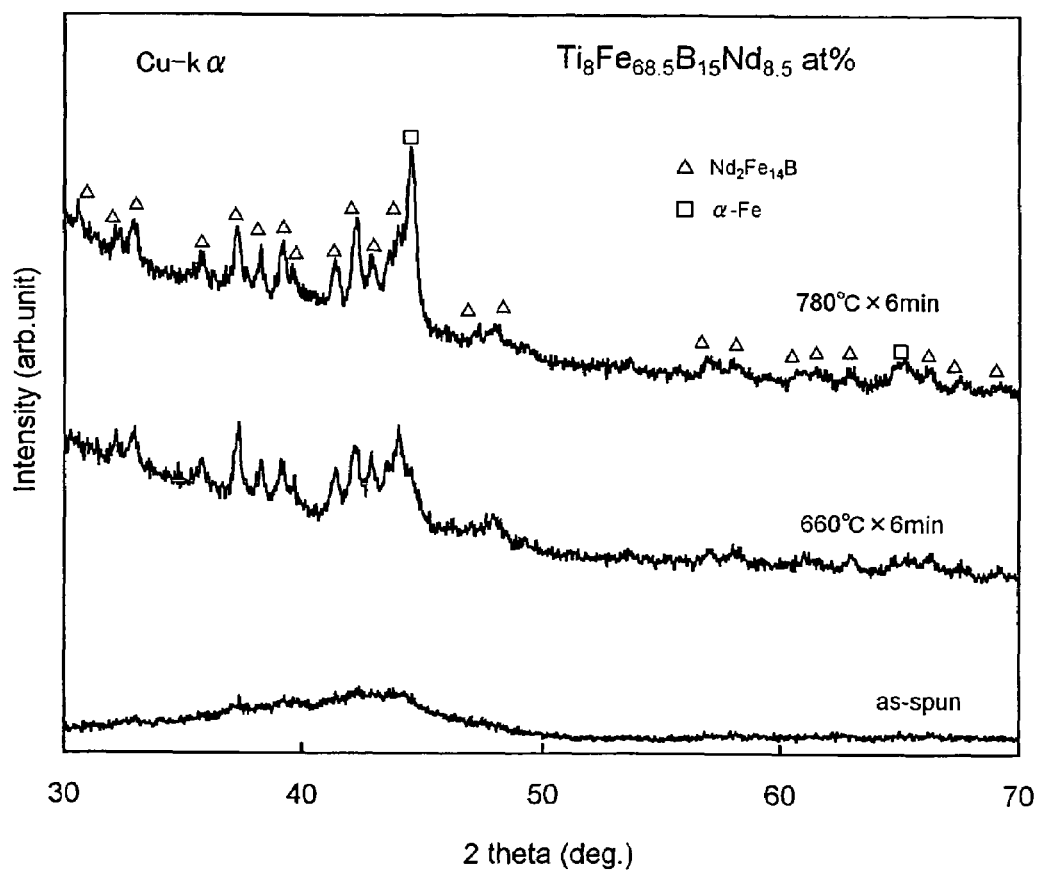
FIG. 10 is a graph illustrating the XRD (X-Ray Diffraction) patterns of the sample No. 13 before and after the sample is thermally treated.
Figure 11:
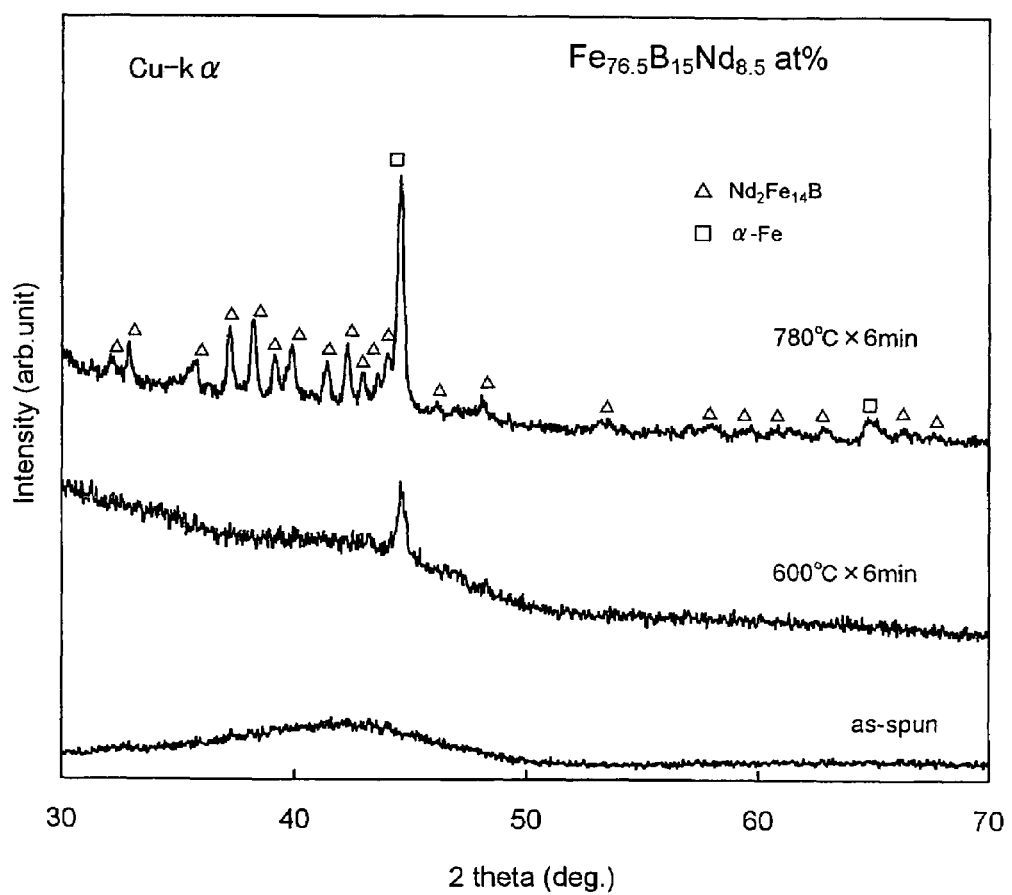
FIG. 11 is a graph illustrating the XRD patterns of the sample No. 17 before and after the sample is thermally treated.

FIG. 9 illustrates the demagnetization curves of samples Nos. 13 and 17. In FIG. 9, the ordinate represents the remanence while the abscissa represents the demagnetization field strength. As can be seen from FIG. 9, the demagnetization curve of sample No. 13 has loop squareness much better than that of sample No. 17. FIG. 10 illustrates the XRD patterns of sample No. 13 before and after the heat treatment, while FIG. 11 illustrates the XRD patterns of sample No. 17 before and after the heat treatment.

As can be seen from FIG. 10, where Ti was added, no diffraction peaks representing crystallinity were observed in the alloy yet to be heat-treated (i.e., in the "as-spun" state). However, after the alloy had been heat-treated at 660° C. for 6 minutes, some diffraction peaks, showing the existence of a compound phase with the $Nd_2Fe_{14}B$ crystal structure, were observed. In this case, diffraction peaks corresponding to the α-Fe phase were also observed but the intensities thereof were not so high. And when the heat treatment was conducted at 780° C., the diffraction peaks corresponding to the α-Fe phase increased their intensities. Accordingly, the crystallization temperature of the α-Fe phase would be higher than that of the $Nd_2Fe_{14}B$ phase.

On the other hand, where no Ti was added, no diffraction peaks, showing the existence of a compound phase with the $Nd_2Fe_{14}B$ crystal structure, were observed, but a diffraction peak corresponding to the α-Fe phase was clearly identified after the alloy had been heat-treated at 660° C. for 6 minutes. This can be easily seen from the results shown in FIG. 11. Also, this result shows that the α-Fe phase had nucleated and grown earlier than the crystallization of the $Nd_2Fe_{14}B$ phase. And where the heat treatment was conducted at 780° C., the diffraction peak of the α-Fe phase increased its intensity considerably. Thus, it can be seen that the grain size of the α-Fe phase increased excessively.

As can be seen from these results, where the mole fraction x of Q is 15 at % or more, the mole fraction z of M is preferably greater than 3.0.

Next, a melt of an alloy with a composition $Nd_9Fe_{78.7}B_{10.3}Ti_2$ (where the mole fractions are indicated in atomic percentages) was rapidly cooled with the pressure of the ambient gas and the surface velocity of the roller changed.

The quartz crucible used for preparing the melt had an orifice with a diameter of 0.8 mm at the bottom. Accordingly, the alloy including these materials was melted in the quartz crucible to be a melt, which was then dripped down through the orifice. The material alloy was melted by a high frequency heating method within an argon environment at a pressure of 1.33 kPa. In the illustrated examples, the temperature of the melt was set to 1500° C.

The surface of the melt was pressurized with Ar gas at 26.7 kPa, thereby propelling the melt against the outer circumference of a copper chill roller, which was located 0.7 mm under the orifice. The other conditions were substantially the same as those placed on sample Nos. 1 to 19. In these examples, the pressure of the quenching environment, roller surface velocity and heat treatment temperature were changed as shown in the following Table 5:

TABLE 5

| | Environment pressure (kPa) | Roller surface velocity (m/s) | Heat treatment temperature (° C.) |
|---|---|---|---|
| 20 | 40.0 | 10.0 | 620 |
| 21 | 35.0 | 15.0 | 640 |
| 22 | 40.0 | 20.0 | 650 |
| 23 | 80.0 | 23.0 | 660 |
| 24 | 60.0 | 12.0 | 640 |
| 25 | 40.0 | 28.0 | 690 |
| 26 | 10.0 | 15.0 | 680 |
| 27 | 40.0 | 35.0 | 700 |
| 28 | 40.0 | 5.0 | 600 |

Figure 12:
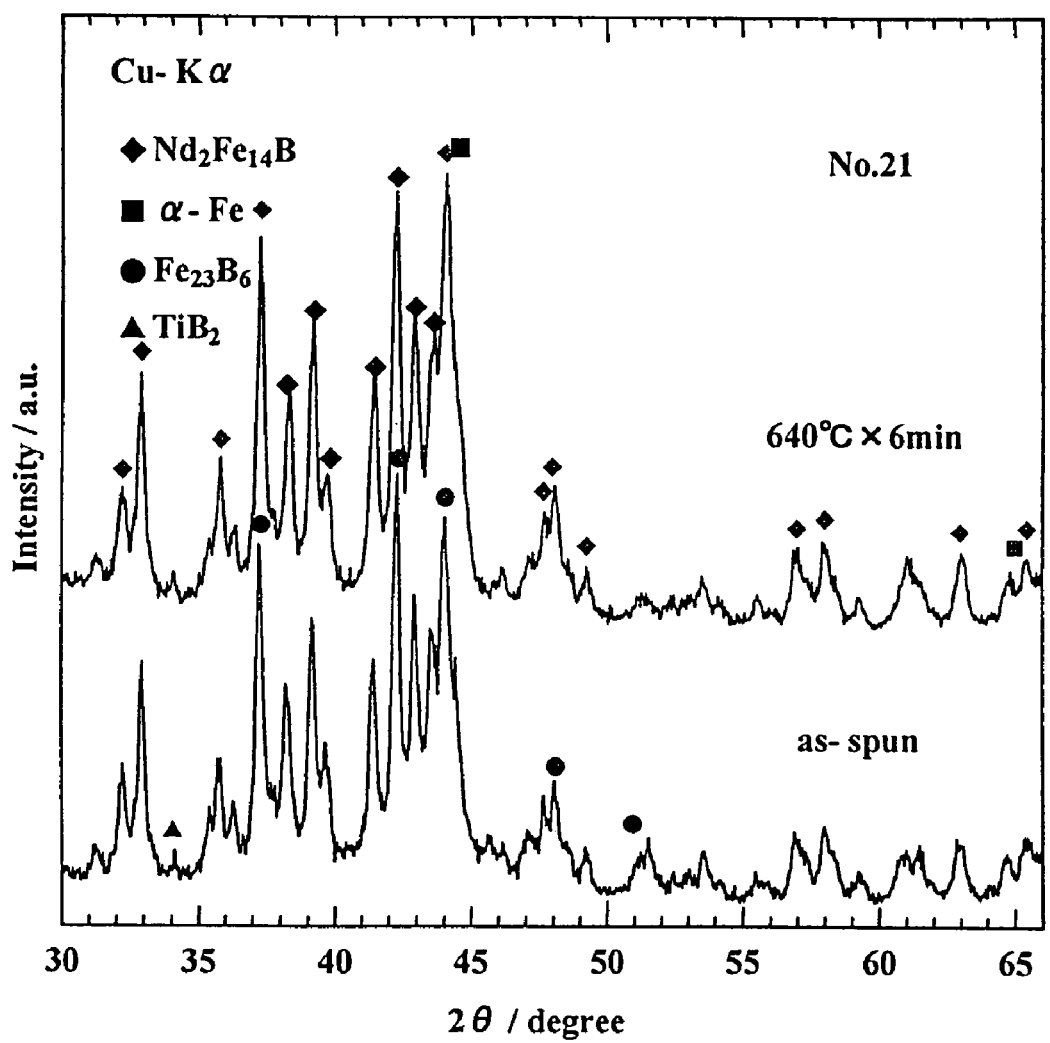
FIG. 12 is a graph illustrating the XRD patterns of sample No. 21 before the sample is heated and crystallized and after it has been heat-treated at 640° C. for 6 minutes.

The rapidly solidified alloy structures obtained by these rapid cooling processes were analyzed using Cu—Kα characteristic X-radiation. Using a TEM, the present inventors confirmed that each of samples Nos. 20 to 25 contained 60 volume % or more of $Nd_2Fe_{14}B$ phase and also confirmed the existence of the α-Fe and $Fe_{23}B_3$ phases in addition to the $Nd_2Fe_{14}B$ phase. FIG. 12 illustrates XRD patterns of sample No. 21. In FIG. 12, the profile labeled as "as-spun" is the XRD pattern of a rapidly solidified alloy yet to be heated. FIG. 12 also illustrates an XRD pattern of sample No. 21 that had already been heated (see the following description).

As for sample No. 26, diffraction peaks, showing the existence of the $Nd_2Fe_{14}B$, α-Fe and $Fe_{23}B_6$ phases, were confirmed. However, only halo patterns were observed for sample No. 27. And for sample No. 28, an intense diffraction peak corresponding to the α-Fe phase and barely recognizable diffraction peaks of the $Nd_2Fe_{14}B$ phase were observed. It should be noted that a lot of amorphous phase existed in sample No. 26.

Next, the rapidly solidified alloy samples Nos. 20 to 26 were heat-treated within Ar gas. Specifically, the rapidly solidified alloys were kept at the respective heat treatment temperatures shown on the rightmost column in Table 5 for 6 minutes and then cooled to room temperature. Thereafter, the magnetic properties of these samples were measured using a vibrating sample magnetometer. The results are shown in the following Table 6:

TABLE 6

| | Magnetic properties | | |
|---|---|---|---|
| | $B_r$ (T) | $H_{cj}$ (kA/m) | $(BH)_{max}$ (kJ/m$^3$) |
| 20 | 0.89 | 705 | 124 |
| 21 | 0.94 | 650 | 130 |
| 22 | 0.95 | 600 | 126 |

TABLE 6-continued

| | $B_r$ (T) | $H_{cJ}$ (kA/m) | $(BH)_{max}$ (kJ/m$^3$) |
|---|---|---|---|
| 23 | 0.88 | 683 | 124 |
| 24 | 0.90 | 670 | 125 |
| 25 | 0.87 | 588 | 120 |
| 26 | 0.83 | 780 | 114 |
| 27 | 0.81 | 754 | 103 |
| 28 | 0.64 | 334 | 38 |

As can be seen from Table 6, each of samples Nos. 20 to 25 exhibited excellent hard magnetic properties including a remanence $B_r$ of 0.85 T or more, an intrinsic coercivity $H_{cJ}$ of 480 kA/m or more and a maximum energy product $(BH)_{max}$ of 120 kJ/m$^3$ or more.

Figure 13:
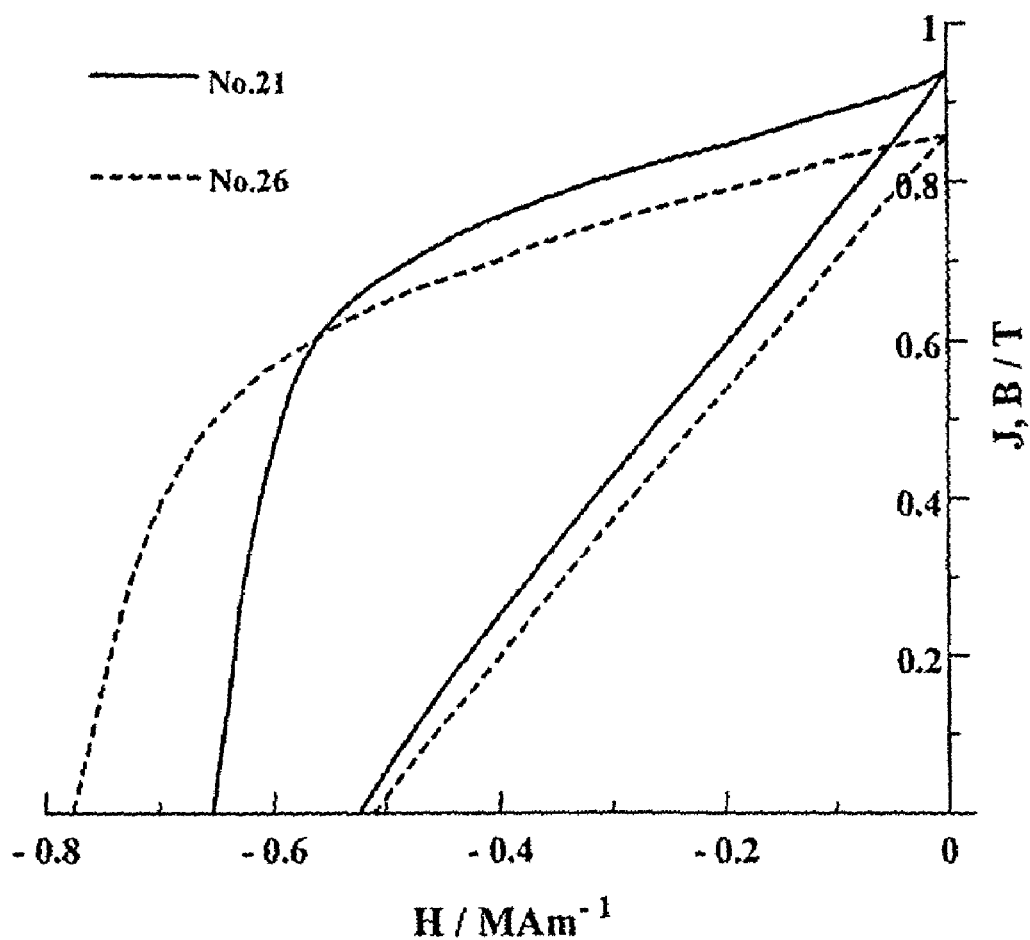
FIG. 13 is a graph illustrating the demagnetization curves of samples Nos. 21 and 26, respectively.

FIG. 13 illustrates the demagnetization curves of samples Nos. 21 and 26, respectively. In FIG. 13, the ordinate represents the remanence while the abscissa represents the demagnetization field strength. As can be seen from FIG. 13, the demagnetization curve of sample No. 21 has loop squareness of the demagnetization curves much better than that of sample No. 26. The sample No. 26 showed deteriorated loop squareness probably because the crystal grain size was large Next, each of the heat-treated samples Nos. 20 to 25 was analyzed using Cu—Kα characteristic X-radiation to identify the respective constituent phases thereof. The size of the constituent phases were determined by TEM. As a result, the $R_2Fe_{14}B$ phase had an average crystal grain size ranging from 20 nm to 100 nm and the α-Fe and iron-based boride phases had an average crystal grain size ranging from 1 nm to 50 nm.

As for samples Nos. 26 and 28 on the other hand, the types of the constituent phases included did not change before and after the heat treatment. But for sample No. 27, the nucleation and growth of α-Fe and $Fe_{23}B_6$ phases, as well as the $R_2Fe_{14}B$ phase, was confirmed.

As can be seen from these results, the quenching environment should have a pressure of 30 kPa or more. And in that case, the surface velocity of the chill roller is preferably from 10 m/sec to 30 m/sec.

According to the present invention, a melt of a material alloy, containing Ti as an additive, is rapidly cooled and solidified, thereby reducing the amount of a rare earth element needed for a permanent magnet. And yet the resultant magnet can exhibit excellent magnetic properties, or has sufficiently high coercivity and remanence.

Also, according to the present invention, even if a rapidly solidified alloy is prepared by a rapid cooling process at a decreased cooling rate, the addition of Ti can suppress the precipitation of the α-Fe phase during the rapid cooling process. Therefore, a strip casting method, or a rapid cooling process resulting in a relatively low cooling rate and suitably applicable to mass production, can be adopted in the present invention, thus reducing the production cost advantageously.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for producing an iron-based rare earth alloy nanocomposite magnet including a hard magnetic phase and a soft magnetic phase, comprising the steps of:
preparing a melt of a material alloy, the material alloy having a composition represented by the general formula: $(Fe_{1-m}T_m)_{100-x-y-z}Q_xR_yM_z$, where T is at least one element selected from the group consisting of Co and Ni; Q is at least one element selected from the group consisting of B and C; R is at least one rare earth element substantially excluding La and Ce; and M is at least one metal element selected from the group consisting of Ti, Zr and Hf and always includes Ti, the mole fractions x, y, z and m meeting the inequalities of:
10 at %<x≦20 at %;
6 at %≦y<10 at %;
0.1 at %≦z≦12 at %; and
0≦m≦0.5, respectively;
rapidly cooling the melt to make a rapidly solidified alloy comprising an $R_2Fe_{14}B$ crystalline phase by:
bringing the melt into contact with the surface of a rotating chill roller to obtain a supercooled liquid alloy; and
dissipating heat from the supercooled alloy into the ambient gas to grow the $R_2Fe_{14}B$ phase after the supercooled alloy has left the chill roller; and thermally treating the rapidly solidified alloy to form a structure in which two or more ferromagnetic crystalline phases, including the hard and the soft magnetic phases, exist, an average grain size of the hard magnetic phase is equal to or greater than 10 nm and equal to or less than 200 nm, and an average grain size of the soft magnetic phase is equal to or greater than 1 nm and equal to or less than 100 nm.

2. The method of claim 1, wherein said rapidly solidified alloy made in the cooling step includes an $R_2Fe_{14}B$ phase at 60 volume percent or more.

3. The method of claim 1, wherein said cooling step comprises rapidly cooling the melt within an ambient gas at a pressure of 30 kPa or more to make a rapidly solidified alloy including an $R_2Fe_{14}B$ phase with an average grain size of 50 nm or less.

4. The method of claim 1, comprising the step of forming a structure in which three or more crystalline phases, including at least $R_2Fe_{14}B$ compound, α-Fe and boride phases are included an average crystal grain size of the $R_2Fe_{14}B$ phase is between 20 nm and 150 nm, and an average crystal grain size of the α-Fe and boride phases is between 1 nm and 50 nm.

5. The method of claim 4, wherein said steps of heating and crystallizing the rapidly solidified alloy produces a boride phase comprising an iron-based boride with ferromagnetic properties.

6. The method of claim 5, wherein said steps of heating and crystallizing the rapidly solidified alloy produces a boride phase comprising an iron-based boride comprises $Fe_3B$ and/or $Fe_{23}B_6$.

7. The method of claim 1, wherein said step of cooling the melt is effected via a strip casting process.

8. A method for producing a bonded magnet, the method comprising the steps of:
preparing a powder of the iron-based rare earth alloy magnet by the method as recited in claim 1; and
processing the powder into a bonded magnet.

* * * * *